(12) United States Patent
Matthiesen et al.

(10) Patent No.: US 12,536,482 B1
(45) Date of Patent: Jan. 27, 2026

(54) LOCATION ACCURACY USING LOCAL DEVICE COMMUNICATIONS

(71) Applicant: Lyft, Inc., San Francisco, CA (US)

(72) Inventors: Taggart Matthiesen, San Francisco, CA (US); Sergey Schlykovich, San Francisco, CA (US); Ethan Eyler, San Francisco, CA (US); Sebastian Brannstrom, San Francisco, CA (US); Sean Murphy, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 120 days.

(21) Appl. No.: 18/163,592

(22) Filed: Feb. 2, 2023

Related U.S. Application Data

(63) Continuation of application No. 15/396,164, filed on Dec. 30, 2016, now Pat. No. 11,574,262.

(51) Int. Cl.
  *G06Q 10/0631* (2023.01)
  *G06F 16/29* (2019.01)
  (Continued)

(52) U.S. Cl.
  CPC ..... *G06Q 10/063114* (2013.01); *G06F 16/29* (2019.01); *G06Q 50/40* (2024.01);
  (Continued)

(58) Field of Classification Search
  None
  See application file for complete search history.

(56) References Cited

U.S. PATENT DOCUMENTS

| | | | |
|---|---|---|---|
| D119,041 S | 2/1940 | MacDonald et al. | |
| 3,093,320 A | 6/1963 | Knapp | |

(Continued)

FOREIGN PATENT DOCUMENTS

| | | | |
|---|---|---|---|
| CA | 2844274 E | 4/2015 | |
| CA | 174696 | 8/2019 | |

(Continued)

OTHER PUBLICATIONS

Khaleel Mershad, A Framework for Implementing Mobile Cloud Services in VANETs, 2013, IEEE Sixth International Conference on Cloud Computing (Year: 2013).*

(Continued)

*Primary Examiner* — Jerry O'Connor
*Assistant Examiner* — Matthew H Divelbiss
(74) *Attorney, Agent, or Firm* — Keller Preece PLLC

(57) ABSTRACT

Embodiments provide techniques, including systems and methods, for improving the accuracy of location information for requestor and provider devices in an dynamic transportation matching system using local communications between computing devices. For example, embodiments allow a provider computing device to identify, pair, and/or communicate with a requestor computing device upon arrival near a request location for a ride matching request. The provider computing device may use signal strength measurements associated with signals received from the requestor computing device to identify a proximity to the requestor computing device and/or to triangulate an accurate location of the requestor computing device. Additionally, the provider computing device may use a combination of the location reported by the ride matching system and the signal strength of the paired connection to identify the location of the requestor computing device.

20 Claims, 18 Drawing Sheets

(51) Int. Cl.
*G06Q 50/40* (2024.01)
*H04L 67/12* (2022.01)
*H04L 67/146* (2022.01)
*H04L 67/51* (2022.01)
*H04L 67/52* (2022.01)
*H04W 4/02* (2018.01)
*H04W 4/024* (2018.01)
*H04W 4/80* (2018.01)

(52) U.S. Cl.
CPC ............ *H04L 67/12* (2013.01); *H04L 67/146* (2013.01); *H04L 67/51* (2022.05); *H04L 67/52* (2022.05); *H04W 4/023* (2013.01); *H04W 4/024* (2018.02); *H04W 4/80* (2018.02)

(56) References Cited

U.S. PATENT DOCUMENTS

| | | |
|---|---|---|
| D205,209 S | 7/1966 | Priddis |
| 4,860,476 A | 8/1989 | Knapp |
| D306,042 S | 2/1990 | Evenson |
| D307,447 S | 4/1990 | Evenson |
| D319,848 S | 9/1991 | Hofman |
| D320,235 S | 9/1991 | Hofman |
| D327,506 S | 6/1992 | Bartholomai et al. |
| D374,191 S | 10/1996 | Terrebonne et al. |
| D379,437 S | 5/1997 | Flaherty |
| D402,909 S | 12/1998 | Stanuch |
| 5,918,397 A | 7/1999 | Elmer |
| D414,572 S | 9/1999 | Chung |
| D418,493 S | 1/2000 | Jobs et al. |
| 6,028,537 A | 2/2000 | Suman et al. |
| D432,038 S | 10/2000 | Sasaki et al. |
| D432,444 S | 10/2000 | Sasaki et al. |
| D434,865 S | 12/2000 | Hussaini et al. |
| D436,193 S | 1/2001 | Tacovelli |
| 6,271,805 B1 | 8/2001 | Yonezawa |
| D483,281 S | 12/2003 | Cobigo |
| D485,825 S | 1/2004 | Yoneda |
| D493,454 S | 7/2004 | Andre et al. |
| 6,759,965 B1 | 7/2004 | Hatjasalo et al. |
| D508,538 S | 8/2005 | Furr |
| D521,471 S | 5/2006 | Hoehn et al. |
| D527,359 S | 8/2006 | Rashid |
| D542,776 S | 5/2007 | Dayan |
| D545,300 S | 6/2007 | Hong et al. |
| D551,107 S | 9/2007 | Kuo |
| D567,876 S | 4/2008 | Au et al. |
| 7,360,248 B1 | 4/2008 | Kanevsky et al. |
| D582,392 S | 12/2008 | Pauschitz et al. |
| D582,394 S | 12/2008 | Hong et al. |
| D624,557 S | 9/2010 | Allen et al. |
| D625,758 S | 10/2010 | Brown et al. |
| D630,353 S | 1/2011 | Reinbach |
| D641,729 S | 7/2011 | Hao et al. |
| D642,159 S | 7/2011 | Joseph |
| D659,677 S | 5/2012 | Kim et al. |
| D690,455 S | 9/2013 | Hagenauer |
| 8,823,508 B2 | 9/2014 | Thiruvengada et al. |
| D728,402 S | 5/2015 | Case |
| D732,049 S | 6/2015 | Amin |
| 9,066,206 B2 | 6/2015 | Lin et al. |
| 9,070,101 B2 | 6/2015 | Abhyanker |
| D734,349 S | 7/2015 | Amin et al. |
| D738,901 S | 9/2015 | Amin |
| 9,151,614 B2 | 10/2015 | Poppen et al. |
| D743,978 S | 11/2015 | Amin |
| 9,230,292 B2 | 1/2016 | Amin et al. |
| D749,116 S | 2/2016 | Luo |
| D749,543 S | 2/2016 | Lovegrove |
| D750,110 S | 2/2016 | Amin et al. |
| 9,285,234 B1 | 3/2016 | Graf et al. |
| D754,675 S | 4/2016 | Vazquez et al. |
| 9,327,641 B1 | 5/2016 | Bowe et al. |
| D759,032 S | 6/2016 | Amin et al. |
| 9,392,418 B2 | 7/2016 | Lubeck |
| D763,894 S | 8/2016 | Lamparelli |
| D766,215 S | 9/2016 | Mackiewicz et al. |
| D766,302 S | 9/2016 | Phelan et al. |
| 9,442,888 B2 | 9/2016 | Stanfield et al. |
| 9,459,622 B2 | 10/2016 | Abhyanker |
| D772,454 S | 11/2016 | Ma |
| 9,494,938 B1 | 11/2016 | Kemler et al. |
| D773,941 S | 12/2016 | Holzer |
| 9,536,271 B2 | 1/2017 | Kalanick et al. |
| 9,552,564 B1 | 1/2017 | Martenis |
| 9,628,975 B1 | 4/2017 | Watkins et al. |
| 9,635,319 B1 | 4/2017 | Englander et al. |
| 9,650,007 B1 | 5/2017 | Snyder et al. |
| 9,754,338 B2 | 9/2017 | Haparnas et al. |
| 9,769,616 B1 | 9/2017 | Pao et al. |
| 9,787,951 B2 | 10/2017 | Kannon et al. |
| D803,812 S | 11/2017 | Liu et al. |
| 9,827,897 B1 | 11/2017 | Muir |
| D806,293 S | 12/2017 | Pennington |
| D812,609 S | 3/2018 | Kimbrough et al. |
| D819,068 S | 5/2018 | Scheel et al. |
| 9,965,960 B1 | 5/2018 | McDavitt-Van Fleet |
| D824,366 S | 7/2018 | Luo et al. |
| 10,147,154 B2 | 12/2018 | Haparnas et al. |
| D842,841 S | 3/2019 | Demin |
| 10,300,876 B1 | 5/2019 | Jacob et al. |
| 10,310,505 B1 | 6/2019 | Hanson et al. |
| D852,791 S | 7/2019 | Sohn et al. |
| D854,568 S | 7/2019 | Hu |
| 10,365,783 B2 | 7/2019 | Bowden et al. |
| D859,704 S | 9/2019 | Norris et al. |
| 10,400,975 B1 | 9/2019 | Bushre |
| D865,715 S | 11/2019 | Manz |
| D868,895 S | 12/2019 | McMillin et al. |
| D875,115 S | 2/2020 | Yan |
| D875,133 S | 2/2020 | Wang et al. |
| 10,554,783 B2 | 2/2020 | Matthiesen et al. |
| D879,804 S | 3/2020 | Corona et al. |
| D880,498 S | 4/2020 | Shahidi et al. |
| D880,499 S | 4/2020 | Fatnani et al. |
| 10,636,108 B2 | 4/2020 | Eyler et al. |
| 10,688,919 B2 | 6/2020 | Kalanick et al. |
| D896,237 S | 9/2020 | Bentley et al. |
| 10,759,442 B2 | 9/2020 | Stenneth et al. |
| 10,791,536 B1 | 9/2020 | Murphy |
| D904,425 S | 12/2020 | Paul |
| D907,660 S | 1/2021 | Lee et al. |
| D912,670 S | 3/2021 | Etgar et al. |
| D912,686 S | 3/2021 | Yang |
| D915,440 S | 4/2021 | Kim et al. |
| D915,449 S | 4/2021 | Menninger |
| D916,720 S | 4/2021 | Park et al. |
| D916,764 S | 4/2021 | Kirsanov et al. |
| D917,544 S | 4/2021 | Wong |
| D918,174 S | 5/2021 | Czaniecki et al. |
| D925,080 S | 7/2021 | Gu et al. |
| D931,902 S | 9/2021 | Moore et al. |
| 11,118,930 B2 | 9/2021 | Eyler et al. |
| D935,443 S | 11/2021 | Yuan |
| D962,190 S | 8/2022 | Du et al. |
| 11,443,398 B2 | 9/2022 | Haparnas et al. |
| D967,266 S | 10/2022 | McMillin et al. |
| D969,653 S | 11/2022 | Vitiello et al. |
| 11,922,835 B2 | 3/2024 | Vitiello et al. |
| D1,024,019 S | 4/2024 | Park et al. |
| D1,032,889 S | 6/2024 | Huang et al. |
| D1,035,099 S | 7/2024 | Gu et al. |
| D1,037,210 S | 7/2024 | Lin |
| 2002/0065046 A1 | 5/2002 | Mankins et al. |
| 2003/0217150 A1* | 11/2003 | Roese .................. H04L 67/04 709/225 |
| 2004/0243430 A1 | 12/2004 | Horstemeyer |
| 2005/0030224 A1 | 2/2005 | Koch |
| 2005/0100329 A1 | 5/2005 | Lao et al. |
| 2005/0109075 A1 | 5/2005 | Kithil et al. |
| 2006/0290158 A1 | 12/2006 | Cullison |
| 2007/0133210 A1 | 6/2007 | Watson et al. |
| 2007/0179709 A1 | 8/2007 | Doyle |

(56) References Cited

U.S. PATENT DOCUMENTS

| | | |
|---|---|---|
| 2008/0084360 A1 | 4/2008 | Shingai |
| 2008/0114629 A1 | 5/2008 | Pavlov |
| 2008/0195428 A1 | 8/2008 | O'Sullivan |
| 2008/0284578 A1 | 11/2008 | Mouratidis |
| 2008/0288165 A1 | 11/2008 | Suomela et al. |
| 2009/0033481 A1 | 2/2009 | Kuvantrarai |
| 2009/0044235 A1 | 2/2009 | Davidson |
| 2009/0099732 A1 | 4/2009 | Pisz |
| 2009/0160229 A1 | 6/2009 | Mabuchi et al. |
| 2009/0248283 A1 | 10/2009 | Bicego, Jr. |
| 2009/0319181 A1 | 12/2009 | Khosravy et al. |
| 2010/0112945 A1 | 5/2010 | Hanif |
| 2010/0283609 A1 | 11/2010 | Remer |
| 2011/0156894 A1 | 6/2011 | Lin et al. |
| 2011/0195758 A1 | 8/2011 | Damale |
| 2011/0301985 A1 | 12/2011 | Camp et al. |
| 2012/0006611 A1* | 1/2012 | Wallace ............ H04M 1/72412<br>180/272 |
| 2012/0081389 A1 | 4/2012 | Dilts |
| 2012/0137256 A1 | 5/2012 | Lalancette et al. |
| 2012/0290652 A1 | 11/2012 | Boskovic |
| 2013/0018795 A1 | 1/2013 | Kolhatkar et al. |
| 2013/0096827 A1 | 4/2013 | McCall et al. |
| 2013/0132140 A1 | 5/2013 | Amin et al. |
| 2013/0332026 A1 | 12/2013 | McKown |
| 2014/0011522 A1 | 1/2014 | Lin et al. |
| 2014/0129951 A1 | 5/2014 | Amin et al. |
| 2014/0172727 A1 | 6/2014 | Abhyanker et al. |
| 2014/0266594 A1 | 9/2014 | Reiser |
| 2015/0148989 A1* | 5/2015 | Cooper ................ E05F 15/77<br>701/2 |
| 2015/0161564 A1 | 6/2015 | Sweeney et al. |
| 2015/0161752 A1 | 6/2015 | Barreto et al. |
| 2015/0166009 A1 | 6/2015 | Outwater et al. |
| 2015/0199664 A1 | 7/2015 | Buckman et al. |
| 2015/0210287 A1 | 7/2015 | Penilla et al. |
| 2015/0253147 A1 | 9/2015 | Gruijters et al. |
| 2015/0262430 A1 | 9/2015 | Farrelly et al. |
| 2015/0271290 A1 | 9/2015 | Tao et al. |
| 2015/0289109 A1 | 10/2015 | Lubeck et al. |
| 2015/0317801 A1 | 11/2015 | Bentley et al. |
| 2015/0332425 A1 | 11/2015 | Kalanick et al. |
| 2015/0339923 A1 | 11/2015 | Konig |
| 2015/0348408 A1 | 12/2015 | Demisse |
| 2015/0352947 A1 | 12/2015 | Hubschman et al. |
| 2015/0356470 A1 | 12/2015 | Mitchell |
| 2016/0016526 A1 | 1/2016 | Louboutin |
| 2016/0027307 A1 | 1/2016 | Abhyanker et al. |
| 2016/0034828 A1 | 2/2016 | Sarawgi et al. |
| 2016/0034845 A1 | 2/2016 | Hiyama et al. |
| 2016/0086391 A1 | 3/2016 | Ricci |
| 2016/0093212 A1 | 3/2016 | Barfield, Jr. et al. |
| 2016/0094964 A1 | 3/2016 | Barfield, Jr. et al. |
| 2016/0117610 A1 | 4/2016 | Ikeda |
| 2016/0119260 A1 | 4/2016 | Ghafourifar et al. |
| 2016/0140649 A1 | 5/2016 | Kleve et al. |
| 2016/0292596 A1 | 10/2016 | Gaitan et al. |
| 2016/0293012 A1 | 10/2016 | Lubeck |
| 2016/0321566 A1 | 11/2016 | Liu et al. |
| 2016/0321771 A1 | 11/2016 | Liu et al. |
| 2016/0334232 A1* | 11/2016 | Zhuang ................. G06Q 10/02 |
| 2016/0349067 A1 | 12/2016 | Fowe |
| 2016/0364678 A1 | 12/2016 | Cao |
| 2017/0038948 A1 | 2/2017 | Cun et al. |
| 2017/0052034 A1 | 2/2017 | Magazinik |
| 2017/0053574 A1 | 2/2017 | Byrd |
| 2017/0090850 A1 | 3/2017 | Amrhein et al. |
| 2017/0115125 A1 | 4/2017 | Outwater et al. |
| 2017/0124835 A1 | 5/2017 | Boyina et al. |
| 2017/0147959 A1 | 5/2017 | Sweeney et al. |
| 2017/0178269 A1 | 6/2017 | McKinnon et al. |
| 2017/0193404 A1 | 7/2017 | Yoo et al. |
| 2017/0193826 A1 | 7/2017 | Marueli et al. |
| 2017/0270794 A1* | 9/2017 | Sweeney ................ G08G 1/005 |
| 2017/0305332 A1 | 10/2017 | Albou et al. |
| 2017/0350719 A1 | 12/2017 | Moore et al. |
| 2018/0047091 A1 | 2/2018 | Ogden et al. |
| 2018/0053215 A1 | 2/2018 | E Costa |
| 2018/0060827 A1 | 3/2018 | Abbas et al. |
| 2018/0089605 A1 | 3/2018 | Poornachandran et al. |
| 2018/0137595 A1 | 5/2018 | Kim et al. |
| 2018/0189713 A1 | 7/2018 | Matthiesen et al. |
| 2018/0191863 A1 | 7/2018 | Matthiesen et al. |
| 2018/0203591 A1 | 7/2018 | Callen et al. |
| 2018/0262891 A1 | 9/2018 | Wu et al. |
| 2019/0050787 A1 | 2/2019 | Munafo et al. |
| 2019/0073738 A1 | 3/2019 | Haparnas et al. |
| 2019/0283763 A1 | 9/2019 | Wang |
| 2020/0104601 A1 | 4/2020 | Karoui et al. |
| 2020/0105130 A1 | 4/2020 | Chen et al. |
| 2020/0107226 A1 | 4/2020 | Raleigh et al. |
| 2020/0126325 A1 | 4/2020 | Jeon et al. |
| 2020/0151675 A1 | 5/2020 | McCormack |
| 2020/0228628 A1 | 7/2020 | Matthiesen et al. |
| 2021/0097315 A1 | 4/2021 | Carruthers et al. |
| 2021/0118078 A1 | 4/2021 | Wang et al. |
| 2021/0192241 A1 | 6/2021 | Zhu et al. |
| 2021/0402942 A1 | 12/2021 | Torabi et al. |
| 2022/0237277 A1 | 7/2022 | Rahman et al. |
| 2022/0238052 A1 | 7/2022 | Vitiello et al. |
| 2022/0358800 A1 | 11/2022 | Ham |
| 2023/0311751 A1 | 10/2023 | Williams |

FOREIGN PATENT DOCUMENTS

| | | |
|---|---|---|
| CN | 104992509 A | 10/2015 |
| CN | 304613845 | 5/2018 |
| EP | 2605459 A1 | 6/2013 |
| JP | 2003-151081 A | 5/2003 |
| JP | 2004-038672 A | 2/2004 |
| JP | 2004-078639 A | 3/2004 |
| JP | 3818127 B2 | 9/2006 |
| JP | 3975380 B2 | 9/2007 |
| JP | 2016-182855 A | 10/2016 |
| KR | 10-2010-0129531 A | 12/2010 |
| KR | 2012-0024135 A | 3/2012 |
| KR | 10-2015-0045962 A | 4/2015 |
| KR | 10 1518140 B1 | 5/2015 |
| KR | 2016-0063474 A | 6/2016 |
| WO | WO 2008/100489 A2 | 8/2008 |
| WO | WO 2018/064532 | 4/2018 |
| WO | WO 2018/125827 | 7/2018 |
| WO | WO 2018/125831 | 7/2018 |
| WO | WO-2019209872 A1 * | 10/2019 ......... H04L 43/0894 |

OTHER PUBLICATIONS

Notice of Allowance as received in MX application MX/a/2019/003642 dated Nov. 21, 2023.
U.S. Appl. No. 16/424,164, Oct. 19, 2023, Notice of Allowance.
U.S. Appl. No. 16/852,253, Oct. 12, 2023, Office Action.
U.S. Appl. No. 16/424,164, Jun. 23, 2023, Office Action.
U.S. Appl. No. 16/834,820, Sep. 14, 2023, Notice of Allowance.
U.S. Appl. No. 16/852,253, Jul. 3, 2023, Office Action.
U.S. Appl. No. 17/822,665, Sep. 11, 2023, Notice of Allowance.
Examination Report as received in Australian Application 2017336943 dated Dec. 20, 2019.
International Search Report and Written Opinion as received in PCT/2017/054409 dated Jan. 10, 2018.
International Search Report and Written Opinion as received in PCTUS2017068283, dated Apr. 17, 2018.
International Search Report & Written Opinion as received in PCT/US2017/068295 dated Apr. 23, 2018.
Office Action as received in Canadian Application 3,035,259 dated Feb. 20, 2020.
Examiner's Report as received in Canadian application 3,035,259 dated May 5, 2021.
Range: For Youth, apppicker.com [online], released on Apr. 10, 2014, [retrieved on Feb. 6, 2020], retrieved from the Internet <URL: https://www.apppicker.com/apps/853769848/range-for-youth> (Year: 2014).

(56) References Cited

OTHER PUBLICATIONS

Examiner's Report as received in Canadian application 174696 dated May 17, 2018.
Examiner's Report as received in Canadian application 174696 dated Feb. 6, 2018.
Examiner's Report as received in Canadian application 181231 dated May 17, 2018.
Examiner's Report as received in Canadian application 181231 dated Feb. 6, 2019.
First Examination Report as received in Indian patent application 293635 dated Jun. 8, 2017.
First Examination Report as received in Indian patent application 293636 dated Jun. 13, 2017.
Office Action as received in Mexican Application MX/f/2017/001364 date Jul. 20, 2020 [No English translation available].
H. A. N. C. Bandara, A Multi-Agent System for Dynamic Ride Sharing, Dec. 28-31, 2009, Fourth International Conference on Industrial and Information Systems, ICIIS 2009 (Year: 2009).
U.S. Appl. No. 16/424,164, Jun. 29, 2020, Office Action.
U.S. Appl. No. 16/424,164, Oct. 29, 2020, Office Action.
U.S. Appl. No. 16/424,164, Feb. 5, 2021, Office Action.
U.S. Appl. No. 29/650,461, Feb. 12, 2020, Office Action.
U.S. Appl. No. 29/650,461, May 13, 2020, Notice of Allowance.
U.S. Appl. No. 29/748,123, Jan. 7, 2021, Office Action.
U.S. Appl. No. 29/748,123, May 14, 2021, Office Action.
U.S. Appl. No. 15/396,417, May 5, 2017, Office Action.
U.S. Appl. No. 15/396,417, Sep. 5, 2017, Office Action.
U.S. Appl. No. 15/396,417, Jun. 14, 2018, Office Action.
U.S. Appl. No. 15/396,417, Jan. 10, 2019, Office Action.
U.S. Appl. No. 15/396,417, Sep. 26, 2019, Office Action.
U.S. Appl. No. 15/396,417, Feb. 11, 2020, Notice of Allowance.
U.S. Appl. No. 15/396,390, Mar. 7, 2019, Office Action.
U.S. Appl. No. 15/396,390, Oct. 8, 2019, Notice of Allowance.
U.S. Appl. No. 15/396,164, Mar. 22, 2019, Office Action.
U.S. Appl. No. 15/396,164, Oct. 31, 2019, Office Action.
U.S. Appl. No. 15/396,164, Apr. 22, 2020, Office Action.
U.S. Appl. No. 15/396,164, Nov. 23, 2020, Office Action.
U.S. Appl. No. 15/396,164, Jul. 20, 2021, Office Action.
U.S. Appl. No. 15/396,164, Apr. 8, 2022, Office Action.
U.S. Appl. No. 15/396,164, Sep. 22, 2022, Notice of Allowance.
U.S. Appl. No. 29/584,381, Jan. 4, 2019, Restriction of Requirement.
U.S. Appl. No. 29/584,381, Apr. 12, 2019, Office Action.
U.S. Appl. No. 29/584,381, Jul. 25, 2019, Notice of Allowance.
U.S. Appl. No. 16/749,798, Oct. 7, 2020, Office Action.
U.S. Appl. No. 16/749,798, Feb. 9, 2021, Notice of Allowance.
U.S. Appl. No. 29/713,840, Apr. 5, 2022, Ex Parte Quayle Action.
U.S. Appl. No. 29/713,840, Jun. 14, 2022, Notice of Allowance.
U.S. Appl. No. 16/834,820, May 4, 2022, Office Action.
U.S. Appl. No. 16/834,820, Dec. 8, 2022, Office Action.
U.S. Appl. No. 16/852,253, Jul. 15, 2022, Office Action.
U.S. Appl. No. 16/852,253, Nov. 1, 2022, Office Action.
U.S. Appl. No. 16/852,253, Feb. 28, 2023, Office Action.
U.S. Appl. No. 17/343,419, Jun. 20, 2022, Office Action.
U.S. Appl. No. 17/343,419, Nov. 8, 2022, Office Action.
U.S. Appl. No. 29/747,914, Dec. 5, 2022, Restriction Requirement.
U.S. Appl. No. 29/747,914, Feb. 27, 2023, Office Action.
U.S. Appl. No. 14/880,042, Jun. 23, 2016, Office Action.
U.S. Appl. No. 14/880,042, Nov. 29, 2016, Office Action.
U.S. Appl. No. 14/880,042, Apr. 19, 2017, Notice of Allowance.
U.S. Appl. No. 15/680,571, Apr. 2, 2018, Office Action.
U.S. Appl. No. 15/680,571, Aug. 14, 2018, Notice of Allowance.
U.S. Appl. No. 16/171,860, Aug. 19, 2019, Office Action.
U.S. Appl. No. 16/171,860, Nov. 19, 2019, Notice of Allowance.
U.S. Appl. No. 16/171,860, Dec. 30, 2019, Office Action.
U.S. Appl. No. 16/171,860, Jun. 30, 2020, Office Action.
U.S. Appl. No. 16/171,860, Sep. 21, 2020, Office Action.
U.S. Appl. No. 16/171,860, Jan. 12, 2021, Office Action.
U.S. Appl. No. 16/171,860, Feb. 11, 2022, Office Action.
U.S. Appl. No. 16/171,860, May 17, 2022, Notice of Allowance.
U.S. Appl. No. 17/822,665, Jan. 13, 2023, Office Action.
Lin, Jiyan, and Jihui Lin. "Research on the Recommendation Algorithm of Operating Vehicles' Optimum Passenger-Chosen Plots Based on ST-DBSCAN and AHP." RISTI: Revista Iberica de Sistemas e Tecnologias de Inforamcao E13 (2016): 404-. Print.
U.S. Appl. No. 16/852,253, Feb. 7, 2024, Notice of Allowance.
U.S. Appl. No. 18/356,095, Feb. 28, 2024, Office Action.
U.S. Appl. No. 18/356,095, May 22, 2024, Notice of Allowance.
U.S. Appl. No. 16/834,820, Mar. 16, 2023, Office Action.
U.S. Appl. No. 17/343,419, Mar. 15, 2023, Notice of Allowance.
U.S. Appl. No. 29/747,914, Apr. 12, 2023, Notice of Allowance.
U.S. Appl. No. 17/822,665, May 30, 2023, Office Action.
U.S. Appl. No. 18/738,777, Apr. 25, 2025, Office Action.
U.S. Appl. No. 18/738,777, Oct. 14, 2025, Office Action.
U.S. Appl. No. 18/421,607, Nov. 3, 2025, Office Action.
U.S. Appl. No. 29/879,251, Oct. 8, 2025, Office Action.

\* cited by examiner

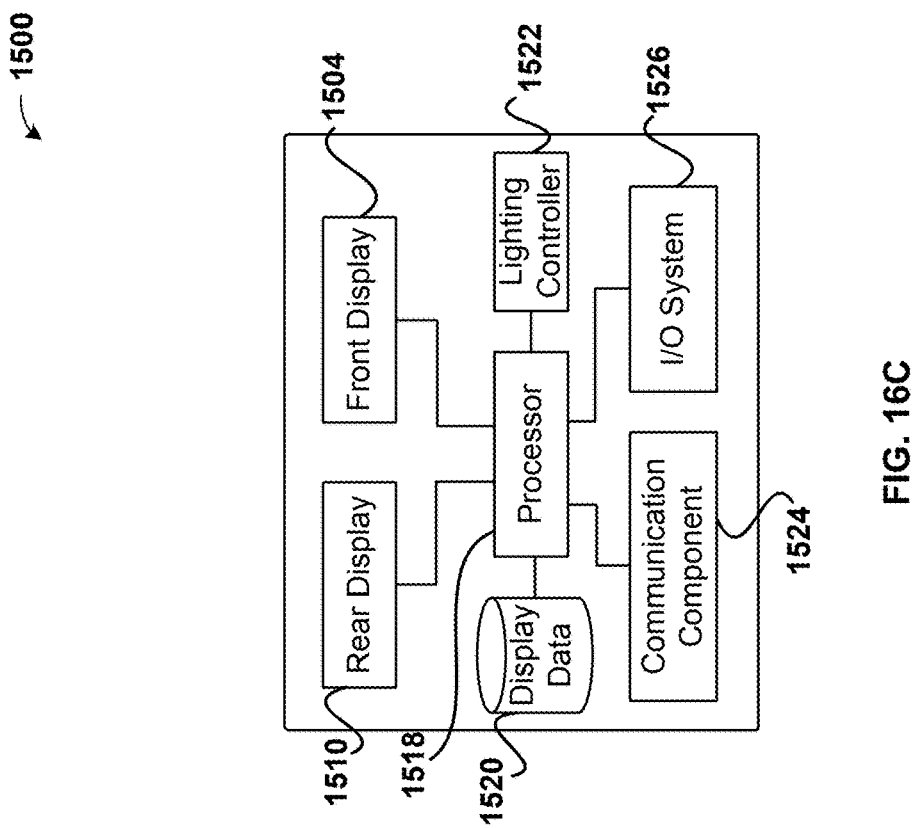
FIG. 16C
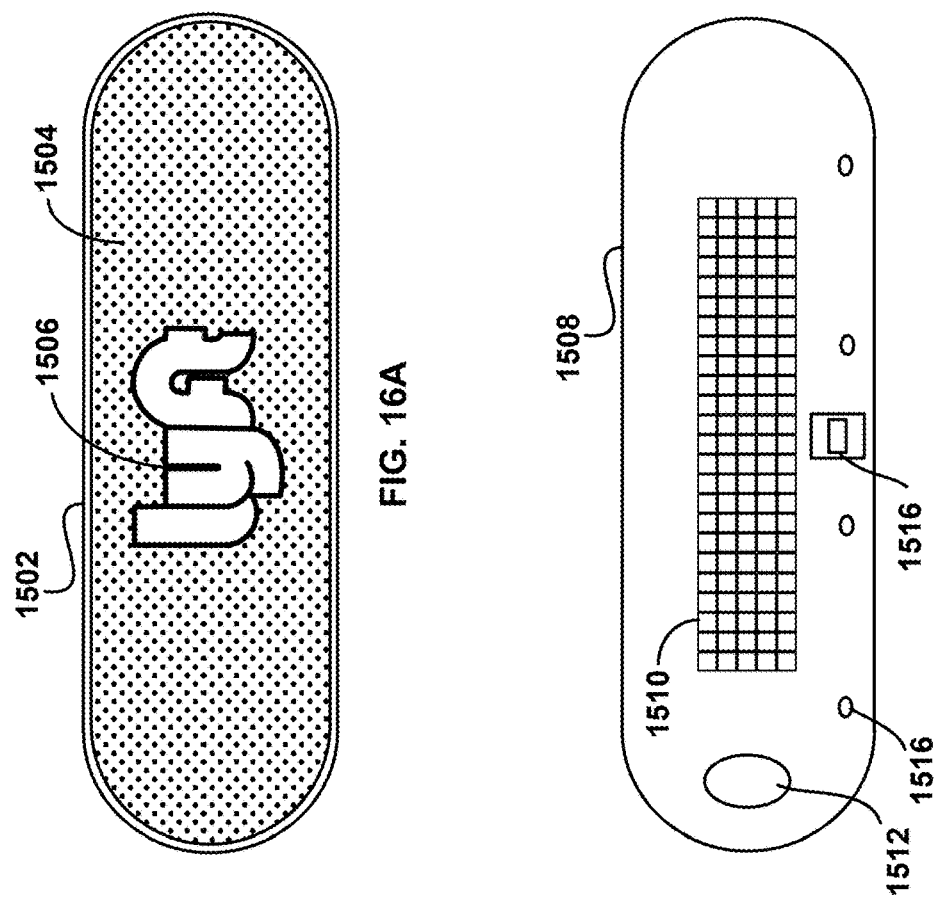
FIG. 16A
FIG. 16B

LOCATION ACCURACY USING LOCAL DEVICE COMMUNICATIONS

CROSS-REFERENCE TO RELATED APPLICATIONS

The present application is a continuation of U.S. application Ser. No. 15/396,164, filed on Dec. 30, 2016. The aforementioned application is hereby incorporated by reference in its entirety.

BACKGROUND

Traditionally, people have requested and received services at fixed locations from specific service providers. For example, various services were fulfilled by making a delivery to a user at a home or work location. Many services can now be accessed through mobile computing devices and fulfilled at arbitrary locations, often by service providers that are activated on demand. Such on-demand service offerings are convenient for users, who do not have to be at fixed locations to receive the services. Additionally, on-demand service matching systems may select and provide requests to service providers based the location and status of service providers near a request location. Accordingly, on-demand matching systems may monitor system resources and control efficient resource allocation based on demand-matching between requestors and providers distributed through a geographic area.

However, it can be difficult to obtain accurate location information for requestors and providers due to interference from the environment in which computing devices are being used in. Further, it can be difficult to communicate accurate location information to the requestors and providers due to the time delay between the requestors and providers communicating through an on-demand matching system. The lack of accurate location information can make it difficult for requestors and providers to locate one another at a point of service. Additionally, as such services have become more prevalent, and more users are interacting with such services, it can be difficult to identify which requestor is associated with a service provider at a geographic request location. This leads to inefficient resource allocation as the misidentification of service providers and requestors at a request location leads to delay, canceled and duplicated requests, as well as mistaken matches between requestors and providers at a request location.

BRIEF DESCRIPTION OF THE DRAWINGS

Various embodiments in accordance with the present disclosure will be described with reference to the drawings, in which:

FIGS. 16A-16C illustrates an example provider communication device in accordance with various embodiments.

DETAILED DESCRIPTION

Figure 1:
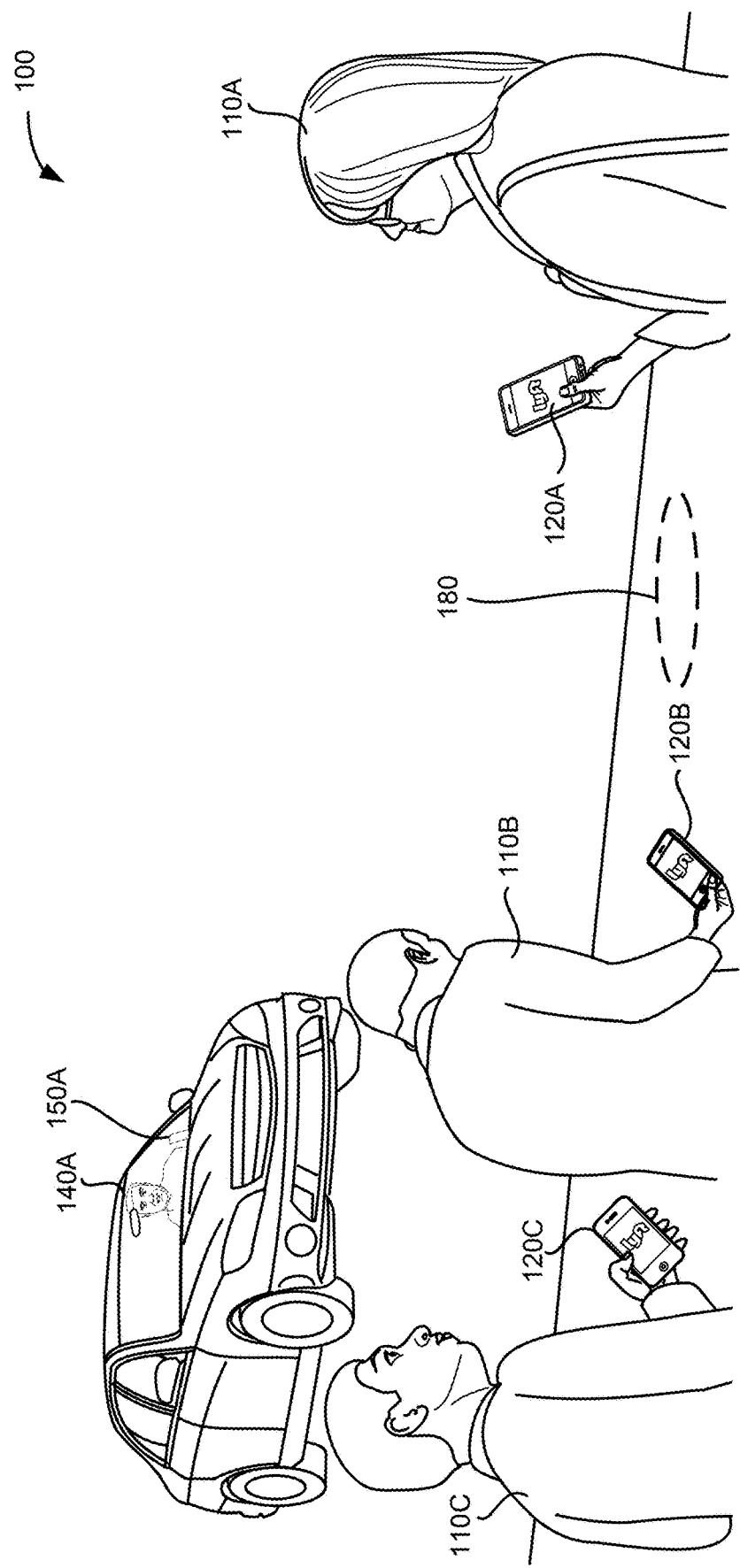
FIG. 1 illustrates an example of an environment including multiple requestors and a provider at a geographic request location.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

On-demand services that are accessed through mobile devices are becoming more prevalent. However, due to the distributed nature of unknown providers and requestors being matched by an on-demand matching system, it can be difficult for providers and requestors to identify one another at the point of service. As such, providers may rely on request locations and reported location data that is received from an on-demand matching system to identify a requestor associated with a service. However, it can be difficult to obtain accurate location information for requestors and providers due to interference from the environment in which computing devices are being used in. Further, it can be difficult to communicate accurate location information to the requestors and providers due to the time delay between the requestors and providers communicating through an on-demand matching system. The lack of accurate location information can make it difficult for requestors and providers to locate one another at a point of service.

Additionally, it can be difficult to locate a requestor as there may be multiple requestors in the same area. This leads to delay, misidentification, and mismatching of providers and requestors at the point of service. For example, multiple requestors may request services at the same address and may have trouble identifying whether a service provider is associated with their request or another request. Similarly, it can be difficult for a provider to identify which of multiple requestors is associated with a request. Moreover, requestors may use a street address or building address as a request location for a service but the address and/or location may have multiple entry and exit points. As such, service providers may arrive at a location but may be on the wrong side of a building, at the wrong exit point, and/or may otherwise have difficulty navigating to the correct requestor. Accordingly, it can be difficult to identify and/or locate a location of a requestor once the service provider has arrived at a requested location. The difficulty in locating requestors leads to delay in the providing of services which can lead to mismanagement of provider resources as well as increased data processing and system communications as requestors cancel requests, place new requests, and require account corrections.

For example, traditionally in ride matching environments that allow drivers and riders to be matched through a mobile application on their smart phones, it can be difficult to identify the exact location of a rider upon arrival at a street address and/or building address. This can lead to people canceling requests as it takes too long for the driver to locate the rider. Additionally, sometimes a rider may request a pick-up at a street level of a building but may later realize that the location is not good for a pick up as there is heavy congestion, street closures, and/or other issues. As such, a requestor may walk down the block to a better pick-up location. As such, the driver may arrive but may not be able to find the requestor as they are no longer at the request location. The rider may cancel their ride request when there is a delay by the driver and/or additional system resources must be used by the rider and/or driver through the initiation of phone calls, text messages, and/or other contact methods to identify the exact location of one another. This can cause dangerous situations when a driver's attention is off the road and/or can lead to further delay. As such, riders may cancel the ride request and request a new ride which can lead to increased system resources usage as more requests are required to fulfill the same rider demand. Additionally, the new ride request can lead to congestion in pick-up locations as additional drivers arrive at the location, further exacerbating the original congestion and confusion at the request location. This can be particularly troublesome at concerts and other high traffic events (e.g., airports, etc.) where many people may desire a pick-up in the same area at around the same time. In such areas, pick-up locations can be very congested and it can be very difficult for a driver to locate a rider based on request location alone.

Embodiments provide techniques, including systems and methods, for improving the accuracy of location information for requestor and provider devices using local communications between computing devices. For example, embodiments allow a provider computing device to identify, pair, and/or communicate with a requestor computing device upon arrival near a request location for a ride matching request. The provider computing device may use signal strength measurements associated with the signals received from the requestor computing device to identify a proximity to the requestor computing device and/or to triangulate an accurate location of the requestor computing device. Additionally, the provider computing device may use a combination of the location reported by the ride matching system and the signal strength measurement to identify the location of the requestor computing device. Accordingly, embodiments allow a provider computing device to better identify an accurate location of the requestor computing device when approaching a request location regardless of the interference within an environment, poor network connection between the requestor computing device and the ride matching system, and/or a poor quality GPS transceiver or other location capabilities of the requestor computing device.

Additionally, embodiments provide techniques, including systems and methods, for navigating to the location of a requestor based on proximity between a requestor and provider once the location has been determined through the local device communication. For example, embodiments allow the use of proximity indicators to allow a provider to quickly, easily, and safely locate a requestor upon arrival near a request location. Further, in some embodiments, graphics associated with a proximity vector may be presented on a provider communication device or provider computing device to clearly display the navigation directions to a provider so that the provider may easily follow the proximity indicators to find their matched requestor without requiring additional communication between the requestor (e.g., rider or passenger) and the provider (e.g., driver). Further, embodiments can provide efficient navigation to requestors by limiting device location-based navigation until the provider is within a threshold distance to the request location to conserve system resources and communication between the on-demand matching system and the provider computing device.

Moreover, embodiments provide intuitive and easily interpretable user interfaces and graphical presentations of navigation information to lead a provider to the requestor's location. Additionally, by providing an efficient mechanism to identify requestor location upon arrival near the request location, embodiments minimize system communications and data processing loads by using request location as an initial navigation point and the requestor computing device as a fine-grain navigation point once close to the request location. Further, by more efficiently identifying the specific location of the requestor computing device and limiting delays in providing services to requestors, embodiments limit the use of system resources for unnecessary canceled ride requests and the issuance of new ride requests as well as the lost downtime and increased throughput of providers.

FIG. 1 illustrates an example of an environment 100 including multiple requestors (e.g., riders or passengers) 110A-110C and a provider (e.g., driver) 140A at a request location 180. Each requestor 110A-110C may have a requestor computing device 120A-120C and the provider 140A may have a provider computing device 150A. The requestor computing device may be used to request services (e.g., a ride or transportation, a delivery, etc.) that may be provided by the provider 140A. The provider computing device may be used to contact available providers and match a request with an available provider. However, it may be difficult for the provider to identify which requestor is matched with their request due to multiple requestors being located at the geographic request location 180. For example, where the requestor is asking for a ride, multiple requestors may enter the same or nearly the same request location for a ride around the same time. As such, a provider may arrive at a pick-up location around the same time to find multiple requestors waiting for their respective matched provider. It may be difficult to identify which requestor is matched with which provider and/or it may be difficult to find the respective requestor when a request location is congested with multiple requestors and/or providers. Moreover, as explained above, it may be difficult to find which exit point to a building a requestor is located at and it may be difficult to find a requestor where the requestor moves away from the initial request location due to the congestion, confusion, and/or unforeseen problems at the request location.

Additionally, it can be difficult to identify the exact location of the requestor computing device as objects in the environment may cause interference and/or otherwise effect the accuracy of the location services on the requestor computing device. For example, tall buildings, trees, mountains, and/or other environmental elements may cause interference with the GPS transceiver of the requestor computing device and affect the ability of the device to identify an accurate location to report to the ride matching system. Additionally, a poor network connection may cause delay in reporting a location of the requestor computing device to the ride matching system and subsequent reporting to the provider computing device. As such, reported requestor device locations may be out-of-date and inaccurate because updated requestor location may not be reported to the ride matching system and subsequently the provider computing device. As such, the provider computing device may not be able to identify an accurate location for the requestor computing device and may not be able to identify the specific requestor from the multiple requestors present at or near the geographic request location.

Accordingly, the provider may not be able to find the correct matched requestor and/or the provider may provide goods or other services to the wrong requestor. Thus, embodiments provide a solution that allows a provider to identify an accurate and current location of the requestor by communicating locally and directly between the provider computing device and the requestor computing device and using signal strength measurements to identify an accurate location upon arrival near the geographic request location. Moreover, embodiments may use the determined accurate requestor computing device location to navigate to the location of the requestor computing device based on proximity between the provider computing device and the requestor computing device.

Figure 2:
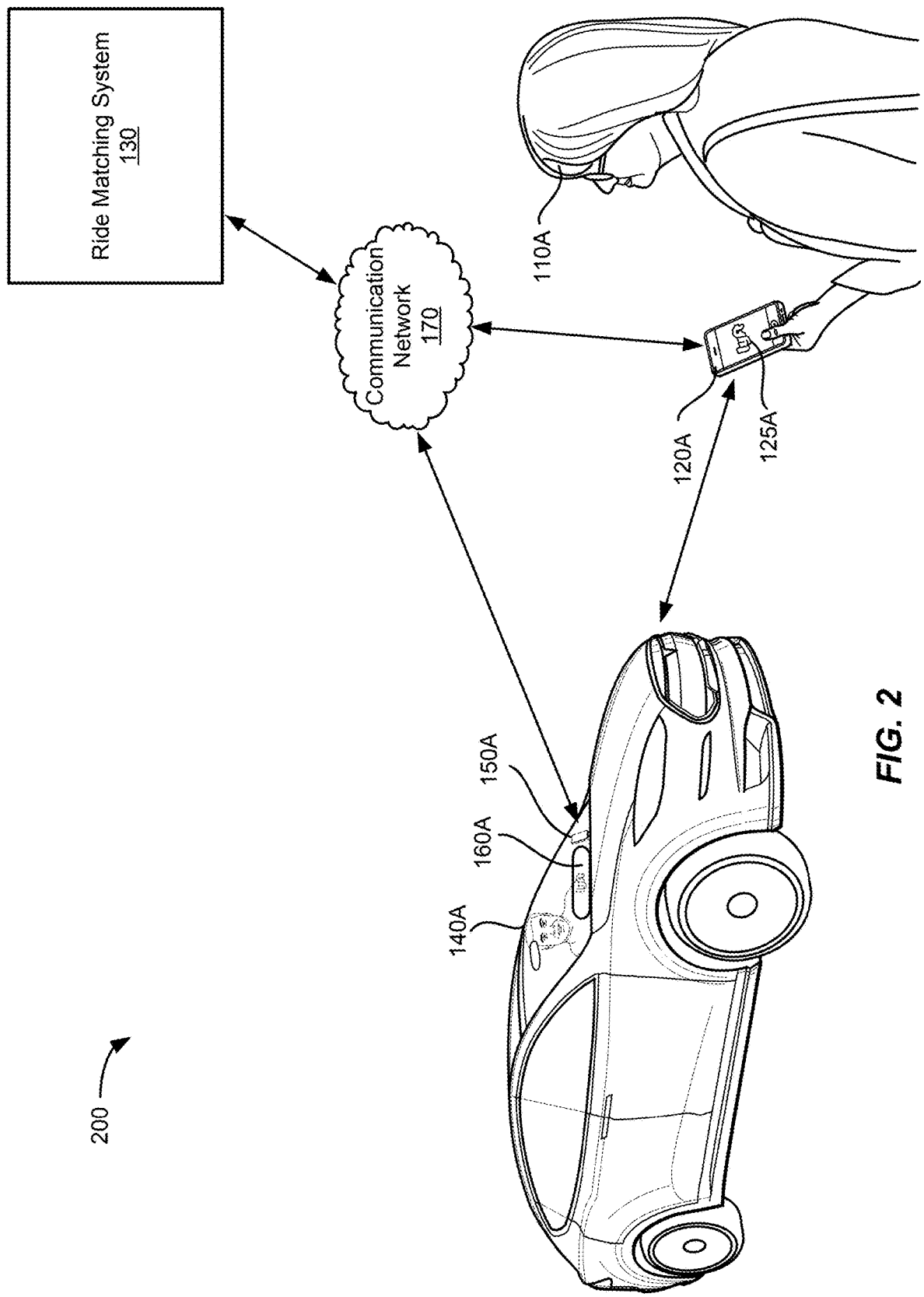
FIG. 2 illustrates an example of a ride matching system including a matched provider and requestor, in accordance with an embodiment of the present techniques.

FIG. 2 illustrates an example of a ride matching system 130 including a matched provider 140A and requestor 110A, in accordance with an embodiment of the present techniques. The ride matching system 130 may be configured to communicate with both the requestor computing device 120A and the provider computing device 150A. The provider computing device 150A may be configured to communicate with a provider communication device 160A that is configured to easily and efficiently display information to a provider 140A and/or a requestor 110A. The requestor 110A may use a ride matching requestor application on a requestor computing device 120A to request a ride at a specified pick-up location. The request may be sent over a communication network 170 to the ride matching system 130. The ride request may include transport request information that may include, for example, a request location, an identifier associated with the requestor and/or the requestor computing device, user information associated with the request, a location of the requestor computing device, a request time (e.g., a scheduled ride may have a future time for the request to be fulfilled or an "instant/current" time for transportation as soon as possible), and/or any other relevant information to matching transport requests with transport providers as described herein. The request location may include, for example, a current location, a future location, a "best fit/predictive" location, a curb segment, or any other suitable information for indicating a location for a requestor to be found at the current time or in the future. In some embodiments, the transport request may further include other request related information including, for example, requestor transport preferences (e.g., highway vs. sidestreets, temperature, music preference (link to $3^{rd}$ party music provider profile, etc.), personalized pattern/color to display on provider communication device, etc.) and requestor transport restrictions (e.g., pet friendly, child seat, wheelchair accessible, etc.).

The ride matching system 130 (also referred to as a "dynamic transport matching system") may identify available providers that are registered with the ride matching system 130 through an application on their provider communication device 150A. The ride matching system 130 may send the ride request to a provider communication device 150A and the provider 140A may accept the ride request through the provider communication device 150A. Additionally and/or alternatively, in some embodiments, the provider may be predictively and/or automatically matched with a request such that the provider may not explicitly accept the request. For instance, the provider may enter a mode where the provider agrees to accept all requests that are sent to the provider without the ability to decline and/or review requests before accepting. In either case, the provider computing device may return information indicative of a match indicating that the provider received the transport request. For example, the information indicative of a match may include a provider accept indicator (e.g., a flag) that indicates the provider received and accepts the indicator or could include a variety of different information. For example, the information indicative of a match may include location information, other route information for other passengers in the vehicle, a schedule for the driver providing information regarding future availability (e.g., when they are going to go offline), diagnostics associated with the car (e.g., gas level, battery level, engine status, etc.), and/or any other suitable information. The provider 140A and the requestor 110A may be matched and both parties may receive match information associated with the other respective party including requestor information (e.g., name, representative symbol or graphic, social media profile, etc.), provider information (e.g., name, representative symbol or graphic, etc.), request location, destination location, respective computing device location, rating, past ride history, any of the other transport request information and/or provider acceptance information identified above, and/or any other relevant information for facilitating the match and/or service being provided. Thus, the ride matching system 130 may dynamically match requestors and providers that are distributed throughout a geographic area.

The ride matching system 130 can monitor the location of the respective requestor computing device 120A and provider computing device 150A and send location information to the respective other device. Thus, as the provider computing device 150A gets closer to the request location 180, the ride matching system 130 may monitor the location of the provider computing device 150A and may send the location of the requestor computing device 120A to the provider computing device 150A. As such, the provider computing device 150A may receive the location of the requestor computing device 120A to allow the provider 140A to identify the specific location of the requestor 110A. However, the location of the requestor computing device provided to the ride matching system may be inaccurate or out of date due to environmental interference, poor network connection, and/or poor location services components of the requestor computing device. Accordingly, the requestor computing device 120A may be configured to communicate locally and directly with the provider computing device 150A and/or the provider communication device 160A. The provider computing device 150A may be configured to identify the location of the requestor computing device 120A based on the direct communication with the requestor computing device 150A and/or information received from the provider communication device 160A from the requestor computing device 120A.

For example, the provider computing device may receive a communication identifier from the ride matching system 130 upon acceptance of a ride request and when the provider computing device 150A is within communication range with the requestor computing device 120A, the provider computing device may receive signals from the requestor computing device. The provider computing device may use the communication identifier to identify a signal or communication as being associated with the requestor computing device. The provider computing device may also forward the communication identifier to one or more provider communication devices to allow the one or more provider communication devices to identify communications from the requestor computing device. Accordingly, the provider computing device and/or the provider communication devices may identify communications from the requestor computing device and use signal strength measurements of the communications from the requestor computing device to triangulate an accurate location of the requestor computing device. The triangulated location based on direct communication between the provider computing device and the requestor computing device may allow the provider computing device to accurately find the requestor location regardless of the environmental interference, quality of the location services of the requestor computing device, and/or poor communication network coverage near the pick-up area.

Figure 3:
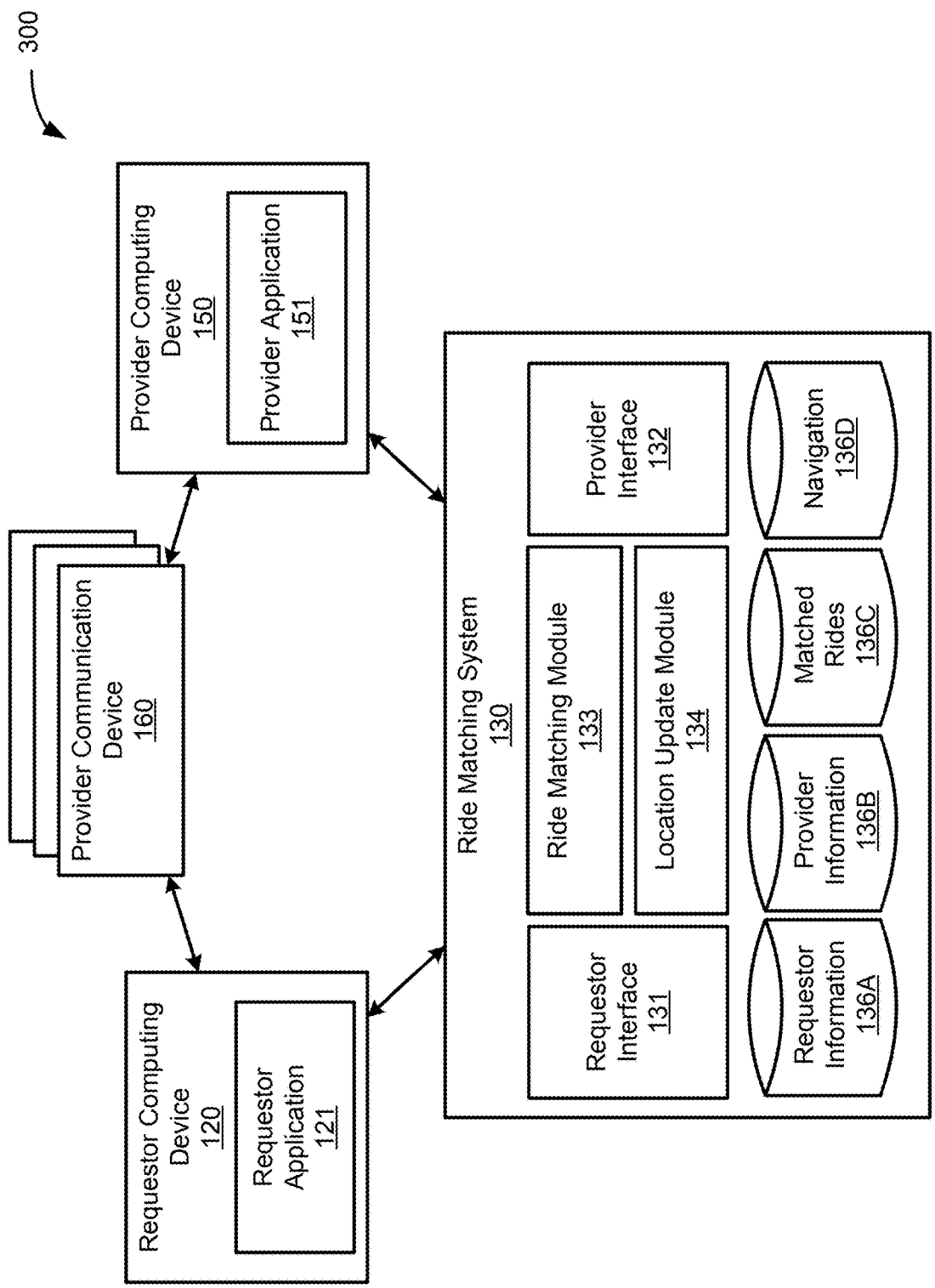
FIG. 3 illustrates an example block diagram of a ride matching system communicating with a provider computing device and a requestor computing device, in accordance with an embodiment of the present techniques.

FIG. 3 illustrates an example block diagram 300 of a ride matching system 130 and ride matching environment 300, in accordance with an embodiment of the present techniques. As described above, the ride matching system 130 may identify and facilitate request matching from requestors 110 associated with requestor computing devices 120 with available providers 140 associated with provider computing devices 150. The ride matching system 130 may include a requestor interface 131, a provider interface 132, a ride matching module 133, and a location update module 134. The ride matching system 130 may also include a requestor information data store 136A, a provider information data store 136B, a matched rides data store 136C, and a navigation data store 136D which may be used by any of the modules of the ride matching system 130 to obtain information in order to perform the functionality of the corresponding module. The ride matching system 130 may be configured to communicate with a plurality of requestor computing devices 120 and a plurality of provider computing devices 150. Although the ride matching system 130 is shown in a single system, the ride matching system 130 may be hosted on multiple server computers and/or distributed across multiple systems. Additionally, the modules may be performed by any number of different computers and/or systems. Thus, the modules may be separated into multiple services and/or over multiple different systems to perform the functionality described herein.

Although embodiments may be described in reference to ride requests, any number of different services may be provided through similar requests and matching functionality. Accordingly, embodiments are not limited to the matching of ride requests and one of ordinary skill would recognize that embodiments could be implemented for any number of different services that have requestors and providers being matched through a network of connected computing devices.

The requestor interface 131 may include any software and/or hardware components configured to send and receive communications and/or other information between the ride matching system 130 and a plurality of requestor computing devices 120. The requestor interface 131 may be configured to facilitate communication between the ride matching system 130 and the requestor application 121 operating on each of a plurality of requestor computing devices 120. The requestor interface 131 may be configured to periodically receive ride requests, location information, a request location (also referred to as a "pick-up" location), requestor status information, a location of the requestor computing device, and/or any other relevant information from the requestor computing device 120 when the requestor application 121 is active on the requestor computing device 120. The ride request may include a requestor identifier, location information for the requestor computing device 120, a pick-up location for the ride request, one or more destination locations, a pick-up time, and/or any other suitable information associated with providing a service to a requestor. The ride request may be sent in a single message or may include a series of messages. The ride matching module 133 may receive the ride request and update a matched rides data store 136C with the ride request information.

Additionally, the requestor interface 131 may be configured to send ride match messages, location information for the provider computing device, provider information, travel routes, pick-up estimates, traffic information, requestor updates/notifications, and/or any other relevant information to the requestor application 121 of the requestor computing device 120. The requestor interface 131 may update a requestor information data store 136A with requestor information received and/or sent to the requestor, a status of the requestor, a requestor computing device location, and/or any other relevant information.

A requestor computing device 120 may include any device that is configured to communicate with a ride matching system 130 and/or provider computing device 150 over one or more communication networks 170. The requestor computing device 120 may comprise a processor, a computer-readable memory, and communication hardware and/or software to allow the requestor computing device 120 to communicate over one or more communication networks 170. For example, a requestor computing device 120 may include a mobile phone, a tablet, a smart watch, a laptop computer, a desktop computer, and/or any other suitable device having a processor, memory, and communication hardware. In some embodiments, the requestor computing device 120 may include a requestor application 121 that is configured to manage communications with the ride matching system 130 and interface with the user (i.e., requestor) of the requestor computing device 120. The requestor application 121 may allow a user to request a ride, monitor the status of a matched ride, pay for a ride, monitor past rides, perform any other requestor-oriented services related to the ride matching system 130, and/or obtain any other requestor-oriented information from the ride matching system 130.

The provider interface 132 may include any software and/or hardware configured to send and receive communications and/or other information between the ride matching system 130 and a plurality of provider computing devices 150. The provider interface 132 may be configured to periodically receive location information of the provider computing device 150, provider status information, and/or any other relevant information from the provider computing device 150 when the provider application 151 is active on the provider computing device 150. Additionally, the provider interface 132 may be configured to send ride requests, location information of a requestor computing device 120, pick-up locations, travel routes, pick-up estimates, traffic information, provider updates/notifications, and/or any other relevant information to the provider application 151 of the provider computing device 150. The provider interface 132 may update a provider information data store 136B with provider information received and/or sent to the provider, provider profile information, a status of the provider, a provider computing device location, and/or any other relevant information.

A provider computing device 150 may include any computing device that is configured to communicate with a ride matching system 130 and/or one or more provider communication devices 160 over one or more communication networks 170. The provider computing device 150 may comprise any device that includes a processor, a computer-readable memory, and communication hardware and/or software to allow the provider computing device 150 to communicate over one or more communication networks 170. For example, a provider computing device 150 may include a mobile phone, a tablet, a smart watch, a laptop computer, a desktop computer, and/or any other suitable device having a processor, memory, and communication hardware. In some embodiments, the provider computing device 150 may include a provider application 151 that is configured to manage communications with the ride matching system 130 and interface with the user of the provider computing device 150. The provider application 151 may allow a user to accept a ride request, monitor the status of a matched ride, obtain or generate navigation directions or a mapped route for a matched ride, get paid for a ride, monitor past rides, perform any other provider-oriented services related to the ride matching system 130, and/or obtain any other provider-oriented information from the ride matching system 130. The provider computing device 150 and the provider application 151 will be discussed in further detail in reference to FIG. 4.

The provider computing device 150 may be configured to communicate with one or more provider communication devices 160 that may be positioned at different locations within the vehicle of the provider. The provider communication devices 160 may be configured to communicate information to a provider or requestor through a display, speakers, and/or other interface components, and/or may be configured to interface with the requestor computing device 120 to identify an accurate location for the requestor. For example, the provider application 151 may be configured to send graphics, a requestor communication identifier, and/or any other information to the one or more provider communication devices 160 to allow the provider communication devices 160 to perform the functionality described herein. Similarly, the provider communication devices may report location information, signal strength information, and/or any other information obtained from interfacing with the requestor computing device to the provider computing device.

The ride matching module 133 may include a software module that is configured to process ride requests, ride responses, and other communications between requestors and providers of the ride matching system 130 to match a requestor and a provider for a requested service. For example, the ride matching module 133 may be configured to identify available providers for a ride request from a requestor by identifying a geographic region associated with the pick-up location and may search a provider information data store 136B to identify available providers within a predetermined distance of the pick-up location and/or the geographic region. The ride matching module 133 may provide the ride request to the provider interface 132 with the provider contact information or provider identifier so that the ride request may be sent to one or more available providers.

The ride matching module 133 may send the ride request and/or the information from the ride request to one or more of the available providers to determine whether the available providers are interested in accepting the ride request. The one or more available providers may receive the ride request through the provider application 151 of the provider computing device 150, may evaluate the request, and may accept or deny the request by providing an input through the provider application 151. A ride response message may be sent to the ride matching system 130 indicating whether a ride was accepted and including a provider identifier, a location of the provider, and/or any other suitable information to allow the ride matching system 130 to process the response. Alternatively, the provider may ignore the request and after a predetermined period of time, the request may be considered denied and a corresponding ride response message may be sent to the ride matching system 130. In some embodiments, no response may be sent unless a ride request is accepted and the ride will be assumed to be denied unless a response is received from the provider.

The ride matching module 133 may receive the ride response, evaluate whether the provider accepted or declined the request, and may either find additional available providers for the request (if declined) or determine the ride request has been accepted and send matched ride information to the requestor computing device 120 and the provider computing device 150. The matched ride information may include provider information, requestor information, the pick-up location, the current location of the provider computing device, the current location of the requestor computing device, a requestor communication identifier, a provider communication identifier, an estimated time of arrival for the provider, and/or any other suitable information to allow the requestor and the provider to complete the requested service. The ride matching module 133 may update the matched rides data store 136C with the corresponding matched ride information for the matched ride.

The location update module 134 may include a software module that is configured to track the location of the provider computing device and the requestor computing device and provide location information to each of the respective devices to facilitate navigating the provider computing device to the requestor computing device (or vice versa). For example, the location update module 134 may be configured to identify when a provider computing device is within a threshold distance to a request location and/or when a provider computing device requests a location of a requestor computing device and provide the respective location to the provider computing device. For instance, the ride matching module 133 may send a request to the location update module 134 in response to a matched ride. The location update module 134 may receive a requestor computing device identifier, a provider computing device identifier, and a pick-up location associated with a matched ride from the ride matching module 133 and may track the progress of the provider computing device 150 in relation to the request location. For example, the location update module 134 may obtain and monitor the location of the provider computing device 150 from the provider information data store 136B and once the provider computing device 150 is within a threshold distance of the request location, the location update module 134 may send the location of the requestor computing device 120 to the provider computing device 150. The provider computing device 150 may then calculate a proximity vector between the location of the provider computing device 150 and the requestor computing device 120 to locate the exact location of the requestor computing device 120 as will be described in further detail below. Similarly, the location update module 134 may identify and monitor the location of the provider computing device 150 and send the location to the requestor computing device 120 upon being within a threshold distance to the provider computing device 150. In some embodiments, the location update module 134 may periodically and/or upon another condition being met, send location updates to both the requestor computing device and the provider computing device for the location of the corresponding device (e.g., provider device location being sent to requestor device and vice versa). Additionally, in some embodiments, the location update module 134 may use the location of each respective device to calculate and provide the proximity vector between the two devices and send the corresponding vector to the provider computing device and/or the requestor computing device as will be described in further detail below.

Figure 4:
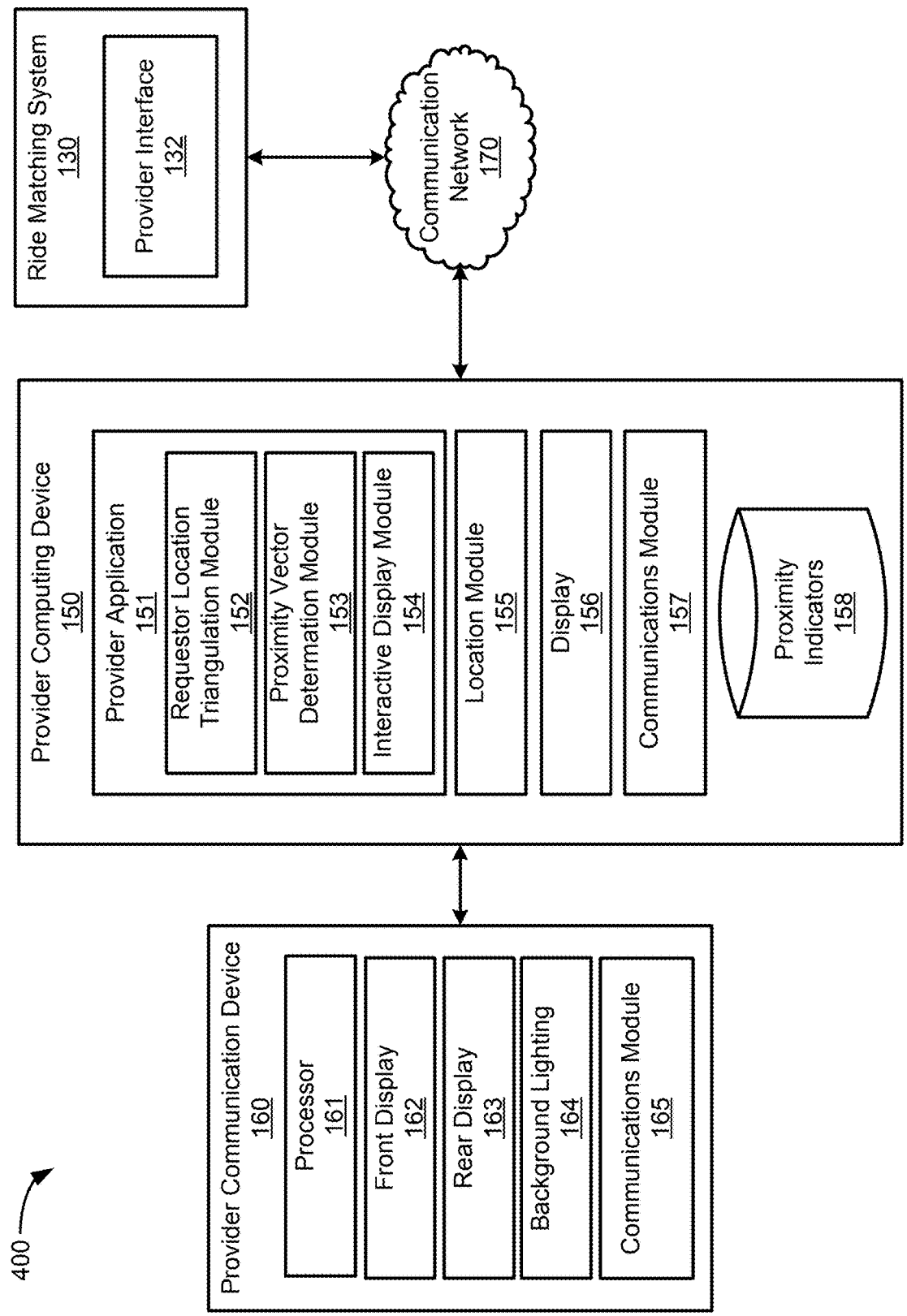
FIG. 4 illustrates an example block diagram of a provider computing device communicating with a ride matching system and a provider communication device, in accordance with an embodiment of the present techniques.

FIG. 4 illustrates an example block diagram 400 of a provider computing device 150 communicating with a ride matching system 130 and a provider communication device 160, in accordance with an embodiment of the present techniques. As described above, the provider computing device 150 is configured to communicate with the ride matching system 130 to receive and provide a response to a request to provide a service. The provider computing device 150 may communicate with the ride matching system 130 through one or more communication networks 170. The provider computing device 150 may communicate with the provider communication device 160 through a wired or wireless connection. For example, in some embodiments, the devices may be paired using Bluetooth™ or another short range communication protocol.

The provider application 151 of the provider computing device 150 is configured to receive the matched ride information including a request location from the provider interface 132 of the ride matching system 130. The provider application 151 may obtain a navigation route to the request location, communicate ride related information to the ride matching system, and/or otherwise interface with the ride matching system as described herein. The provider application may obtain a navigation route to the request location through any suitable method. For example, the ride matching system could provide the navigation instructions directly or could include a link to map information from which one or more navigation routes can be determined and/or any other information that allows the provider computing device to identify navigation directions to a location.

A requestor location triangulation module 152 is a software module of the provider application that is configured to identify a location of a requestor computing device based on local communications with the requestor computing device. The requestor location triangulation module 152 may be configured to obtain a requestor communication identifier from the matched information that is provided to the provider computing device in response to a matched ride. The requestor communication identifier may include any identifier that can be used to identify, pair, and/or communicate with a transceiver of the requestor computing device. For example, the requestor communication identifier may include a device identifier (e.g., a device name, serial number, etc.), a device address (e.g., a unique identifier assigned to a specific communications module of a device), an application identifier (e.g., a unique identifier may be assigned upon installation and/or registration of a requestor application on the requestor computing device), and/or any other information that may be used to identify communications, messages, and/or signals being sent by a requestor computing device. For instance, the communications sent by the requestor computing device may include the requestor communication identifier in a header or as a payload to allow identification of the requestor computing device. The requestor may provide the requestor communication identifier to the ride matching system during registration and/or profile creation and the requestor communication identifier may be stored in the requestor information data store. Accordingly, the ride matching system may send the requestor communication identifier along with the matched ride information upon matching of a ride request. Thus, the requestor location triangulation module may identify the requestor communication identifier from the matched ride information received from the ride matching system.

The requestor location triangulation module may identify the requestor communication identifier from the matched ride information and use the requestor communication identifier to identify communications and/or signals being sent by a communications module of the requestor computing device. For example, the requestor computing device may be sending discovery communications, location pings, and/or any other signals including the requestor communication identifier that may be received by the provider computing device when within transmission distance of the requestor computing device. However, other devices and other requestors may also be sending discovery communications and/or information using the same protocols and frequencies at the same time. Accordingly, the provider computing device may receive a plurality of signals from a plurality of computing devices within communication range of the provider computing device at the same time. Accordingly, the requestor location triangulation module may use the requestor communication identifier to identify a signal of the plurality of signals that is associated with a requestor computing device by comparing the plurality of communication identifiers to the requestor communication identifier. For example, the provider computing device may receive 10 different discovery signals at the same time, each with a different communications identifier being broadcast. The provider computing device may compare the received requestor communication identifier to each of the received communications identifiers to identify the signal associated with the matched requestor computing device. The wireless communication signals may be demodulated by the transceiver and information encapsulated therein (including the communication identifier) may be determined by the communication module using the suitable communications protocol for the wireless communications.

Once the provider computing device discovery signal is identified, the requestor location triangulation module of the provider computing device may use the received signal to determine a location of the requestor computing device. The requestor location triangulation module may use the signal to determine a location of the requestor computing device through a variety of different methods. For example, the requestor location triangulation module may obtain signal strength readings from the communications module and use the signal strength readings to identify a proximity distance to the requestor computing device. For example, the requestor location triangulation module may know the transmission strength of the communication module of the requestor computing device and may convert the received signal strength to a proximity distance based on the known transmission medium (i.e., air). The requestor location triangulation module may use the proximity distance along with a requestor computing device location received from the ride matching system to better identify an exact location of the requestor computing device. Additionally, the requestor location triangulation module may receive multiple readings of the signal strength over time, determine an average distance of the multiple readings, and use the average distance reading to identify the location of the requestor computing device. Averaging multiple readings may smooth out natural signal strength inconsistencies that may naturally arise based on signal interference and the objects in the environment. Thus, in one embodiment, the requestor location triangulation module may use the signal strength readings along with the reported location of the requestor computing device to triangulate a location of the requestor computing device.

Additionally and/or alternatively, the requestor location triangulation module may use multiple readings of the signal strength from the requestor computing device from one or more transceivers located in different locations in the provider vehicle to triangulate the location of the requestor computing device. For example, the requestor location triangulation module may identify the requestor communication identifier from the matched ride information and send the requestor communication identifier to one or more provider communication devices of the provider vehicle that are configured to identify signals received from the requestor computing device and calculate a signal strength of the requestor computing device. The provider communication devices may be located at different locations in the provider vehicle in order to provide different signal strengths in order to triangulate the location of the requestor computing device by comparing the signal strengths of the signals received at the different locations of the provider vehicle. The requestor location triangulation module may receive the signal strength readings from the different provider communication devices, identify proximity distances to each provider communication device based on the various signal strengths in light of the locations of the provider communications device, and use those proximity distances to triangulate a more accurate location of the requestor computing device.

The communications module 157 of the provider computing device may include hardware and software components configured to send and receive communication messages over any suitable communication protocol and frequency range. For example, the communications module may include a communications microchip having a processor, computer-readable medium, and transceiver configured to send and receive information. The communications module may include one or more wireless communication microchips that are be configured to communicate information over any suitable communication protocol including, for example, Bluetooth™, ZigBee™, Wi-Fi, cellular communications (GSM, GPRS, CDMA, WCDMA, EV-DO, EDGE, LTE, etc.), dedicated short-range communications (DSRC) protocols, ANT+, etc. The transceiver of the communications module may be configured to receive a signal and identify the signal strength of the signal, signal to noise ratio, and other features that can be used to characterize the strength, direction, and distance of the transmitter. The communications module may be configured to make multiple readings of the signal strength of the signal and report such readings to one or more applications and/or modules of the computing device.

Additionally and/or alternatively, in some embodiments, the communications module may be configured to pair with a corresponding transceiver of a similarly configured communications module. For example, the communications module may be configured to establish a paired connection with a requestor computing device using the requestor communication identifier by sending a pairing connection request to the computing device and receiving a pairing connection response from the computing device. The pairing connection response may be used to establish the paired connection with the computing device. The communications module may establish an encryption key pair with the corresponding communications module such that the communications are secured from interception. Additionally, the communications modules may be configured to authenticate and/or validate the identity of the corresponding communications module by comparing the communications identifier to a known or expected communications identifier before allowing pairing. Further, in some embodiments, user acceptance may be requested and/or a user may be requested to accept the pairing request before a paired connection is established.

Accordingly, in some embodiments, the location of the requestor computing device may be determined using discovery signals or location pings that may be sent periodically without a paired connection being established. Alternatively and/or additionally, in some embodiments, the location may be determined using a paired connection and using information that is passed between paired devices. Either way, the communications module may be configured to determine a signal strength of a received signal and report this information to the requestor location triangulation module for calculating of a location of the requestor computing device.

A proximity vector determination module 153 is configured to calculate a difference in location between a present location of the provider computing device and a requestor computing device and determine navigation instructions to locate the requestor computing device. For example, the proximity vector determination module may receive a location of a requestor computing device from a ride matching system and calculate a magnitude and a direction of the difference between the location of the provider computing device and the location of the requestor computing device.

The proximity vector determination module may obtain the location of the provider computing device from the location module.

The proximity vector determination module 153 may calculate a magnitude and direction of the difference between the locations through any suitable method. For example, the proximity vector determination module may be configured to receive coordinates for two locations and calculate the difference between the two coordinates. For instance, the coordinates may be provided in the format of a longitude and latitude for each location. The magnitude may include the distance between the two coordinates. The direction may be defined in reference to a location and direction corresponding to the provider computing device. For example, the reference direction may be defined according to a direction of travel of the provider computing device. As such, the proximity vector may be defined in relation to the direction of travel of the provider computing device and/or the navigation route in the direction of the request location from the location of the provider computing device.

Once the proximity vector is determined, the interactive display module 154 may receive the proximity vector from the proximity vector determination module 153 and identify a proximity indicator associated with the proximity vector. The interactive display module 154 may select a proximity indicator that is associated with the magnitude and the direction of the difference between the location of the provider computing device and the location of the requestor computing device. The proximity indicators may include any animation, color, pattern, image, or pattern of colors that indicate a direction, a distance, and/or a direction and a distance to the location of the requestor computing device. The variety of proximity indicators may be stored in a proximity indicators data store 158 and the interactive display module 154 may be configured to submit the magnitude and direction of the proximity vector and obtain a corresponding proximity indicator associated with the magnitude and direction from the proximity indicators data store 158. The proximity indicators data store 158 may include a table of magnitudes and directions to proximity indicators. The proximity indicators data store 158 may associate a variety of different magnitudes and directions with one or more proximity indicators such that the proximity vector determination module may obtain the closest proximity indicator associated with the magnitude and direction without requiring a different proximity indicator for the various iterations of magnitude and direction available. For example, a proximity indicator may be associated with any magnitudes over 15 feet and a direction between 235-270 degrees. As such, any proximity vectors matching these two criteria may return the same proximity indicator. As the magnitude and/or direction of the proximity vector changes as the provider gets closer to the requestor and/or the angle between the provider and the requestor changes, the proximity indicator may change to the next corresponding matching proximity indicator.

The interactive display module 154 of the provider application 151 may be configured to cause the proximity indicator associated with the proximity vector to be displayed. The interactive display module 154 is configured to identify and present a graphic including a pattern, a color, an image, and/or any other information that is associated with the proximity indicator on a display 156 of the provider computing device 150 as well as on one or more displays 162-164 of the provider communication device 160. The interactive display module 154 may send the identified graphical proximity indicator including the pattern, image, animation, and/or colors associated with the proximity indicator to the provider communication device 160 for presentation by the provider communication device 160. For example, the interactive display module may cause graphics corresponding to the proximity indicator to be presented on a rear display 162 of a provider communication device 160 so that a provider may follow the navigation instructions associated with the proximity indicator to the location of the requestor.

The location module 155 may track the location of the provider computing device 150 using any suitable technology. For example, the location module may include a GPS transceiver, network triangulation components, and/or any other suitable technology to identify the present location of the provider computing device. The location module 155 may provide the location of the provider computing device 150 to the provider application 151 for use in determining the triangulation location of the requestor computing device, reporting to the ride matching system 130, and/or use by the proximity vector determination module 153.

In some embodiments, the requestor location triangulation module 152 and/or the proximity vector determination module 153 may use information from the location module 155 to determine when the provider computing device 150 is located within a threshold distance from a request location. Once the provider computing device 150 is within the threshold distance, the requestor location triangulation module 152 and/or the proximity vector determination module 153 of the provider application 151 may send a request for a location of the requestor computing device 120 from the ride matching system 130, receive the location of the requestor computing device 120 from the ride matching system 130, and use the location of the requestor computing device 120 in determining a triangulation location and/or a proximity vector for the requestor computing device as described above.

Additionally, in some embodiments, the magnitude of the proximity vector may be compared to a display threshold to identify whether the magnitude is small enough to start displaying a corresponding proximity indicator. For example, it may not be worthwhile to start displaying proximity indicators to a provider until the provider is close enough to follow the navigation instructions displayed through the proximity indicator. As such, if the magnitude is above the display threshold (meaning that the location of the requestor computing device is over a distance threshold away from the provider), the proximity indicator may not be displayed until the magnitude is smaller than the threshold.

The proximity indicators data store 158 may include proximity indicators that have been configured for display by the provider computing device 150 and/or the provider communication device 160. The proximity indicators may be stored with constraints or rules that dictate when and/or where a proximity indicator may be available to be deployed. For example, some proximity indicators may be limited to particular geographic regions, providers, requestors, times of day, etc. Some patterns, colors, patterns of colors, images, etc., may be preferred by users and/or may be easier to distinguish when being used. For instance, in inclement weather (e.g., rain, fog, etc.), certain colors may be utilized over other colors in order to increase visibility. Additionally, proximity indicators may be selected based on data such as user data. For example, data may be received that a particular user is color-blind; therefore, only certain colors, patterns, etc. may be used from which to select proximity indicators. In some cases, audio may be used in place of visual indicators, for instance if it is determined that a user is visually impaired. Additionally, graphics associated with proximity indicators may be customized by users and/or designed by users of the ride matching system 130. Thus, different user accounts may have custom and/or preferred proximity indicators.

Additionally, in some embodiments, the interactive display module 154 of the provider application 151 may be configured to display other types of system information upon particular conditions being met and/or upon instruction from the ride matching system. For example, the interactive display module may be configured to display provider information including driver metrics (e.g., miles driven, amount earned, status towards a reward, etc.), high demand area navigation directions that may provide higher earning potentials, driver authentication information, and/or any other relevant information to the provider. The interactive display module 154 may be configured to receive the information and/or monitor the provider information for conditions that may be trigger the presentation of such information. For example, when a provider is 5 matched rides away from a reward, the interactive display module 154 may be configured to display such a notice to the provider through a provider communication device in line with the description herein. Further, the proximity navigation features described herein may be used to navigate a provider to a high demand area of a city, region, or state to allow the provider to earn more on their respective rides. Accordingly, the interactive display module 154 may be configured to present a variety of different types of information through a display on the provider computing device and/or a display on the provider communication device 160.

The provider communication device 160 is configured to display the triangulation location of the requestor computing device and/or corresponding graphics associated with the proximity indicator including patterns, colors, and/or images on a front display 162, rear display 163, and/or background lighting 164 of the provider communication device 160. The provider communication device 160 may include a processor 161, a front display 162, a rear display 163, background lighting 164, and a communications module 165. The processor 161 may be configured to receive instructions related to displaying graphics and/or other information associated with the provider application 151 from the provider computing device 150 and present those graphics on one or more of the front display 162, rear display 163, and/or background lighting 164. The processor 161 may be configured to control each of the displays independently and/or as a group. Examples of proximity indicators displayed on a rear display of a provider communication device 160 can be found in reference to FIGS. 7A-7F, 8, and 9A-9E. Proximity indicators may also comprise multimedia elements such as sounds, videos, or any type of audio and/or visual presentation.

The communications module 165 of the provider communication devices may include one or more transceivers that are configured to communicate with the requestor computing device. The communications module 165 of the provider communication device 160 may be the same as the communications module 157 of the provider computing device 150 and may be similarly configured to receive a requestor communication identifier and communicate with a communications module of a requestor computing device 120. For example, the provider communication device 160 may receive the requestor communication identifier from the provider computing device 150 and use the requestor communication identifier to identify signals received from a requestor computing device 120. The communications module 165 of the provider communication device 160 may determine signal strengths of signals received from the requestor computing device and report the signal strengths to the provider computing device. Additionally, in some embodiments, a variety of provider communication devices may be located throughout a provider computing device and may report signal strength readings to the provider computing device for determination of a triangulation location of the requestor computing device. In some embodiments, the variety of provider communication devices 160 located throughout the provider vehicle may have a communications module 165 without the corresponding displays in order to minimize the size and/or footprint of the devices placed throughout the vehicle.

A requestor computing device (not shown) may include similar components and functionality to that of the provider computing device 150 described in reference to FIG. 4. As described above, the requestor computing device 120 is configured to communicate with the ride matching system 130 in order to request a service. The requestor computing device 120 may include a requestor application 121 having an interactive display module with corresponding proximity indicators data and a display. The requestor computing device may include communication components that allow the requestor computing device 120 to communicate over one or more communication networks 170. The requestor computing device 120 may also include a location module and/or other location identification components to allow the requestor computing device 120 to determine its current location and/or position. For example, the location module may implement global positioning system (GPS), cellular communications triangulation, and/or any other suitable location-based techniques to determine the coordinates or location of the requestor computing device 120. The requestor computing device may be configured to perform any of the features of the provider computing device and may have a corresponding communications module, proximity vector determination module, and/or interactive display module as described in reference to the provider computing device 150. As such, similar graphics as described above and below in reference to the provider computing device 150 may be displayed on the requestor computing device as well. The display may include any suitable components to create visible and recognizable light. For instance, the display may include LED arrays, a LCD display, a projector, and/or any other components that create visible light, pixels, and/or images. Additional information regarding the computing devices may be found in reference to FIG. 17 below.

I. Improving Location Accuracy Using Local Device Communications

Figure 5:
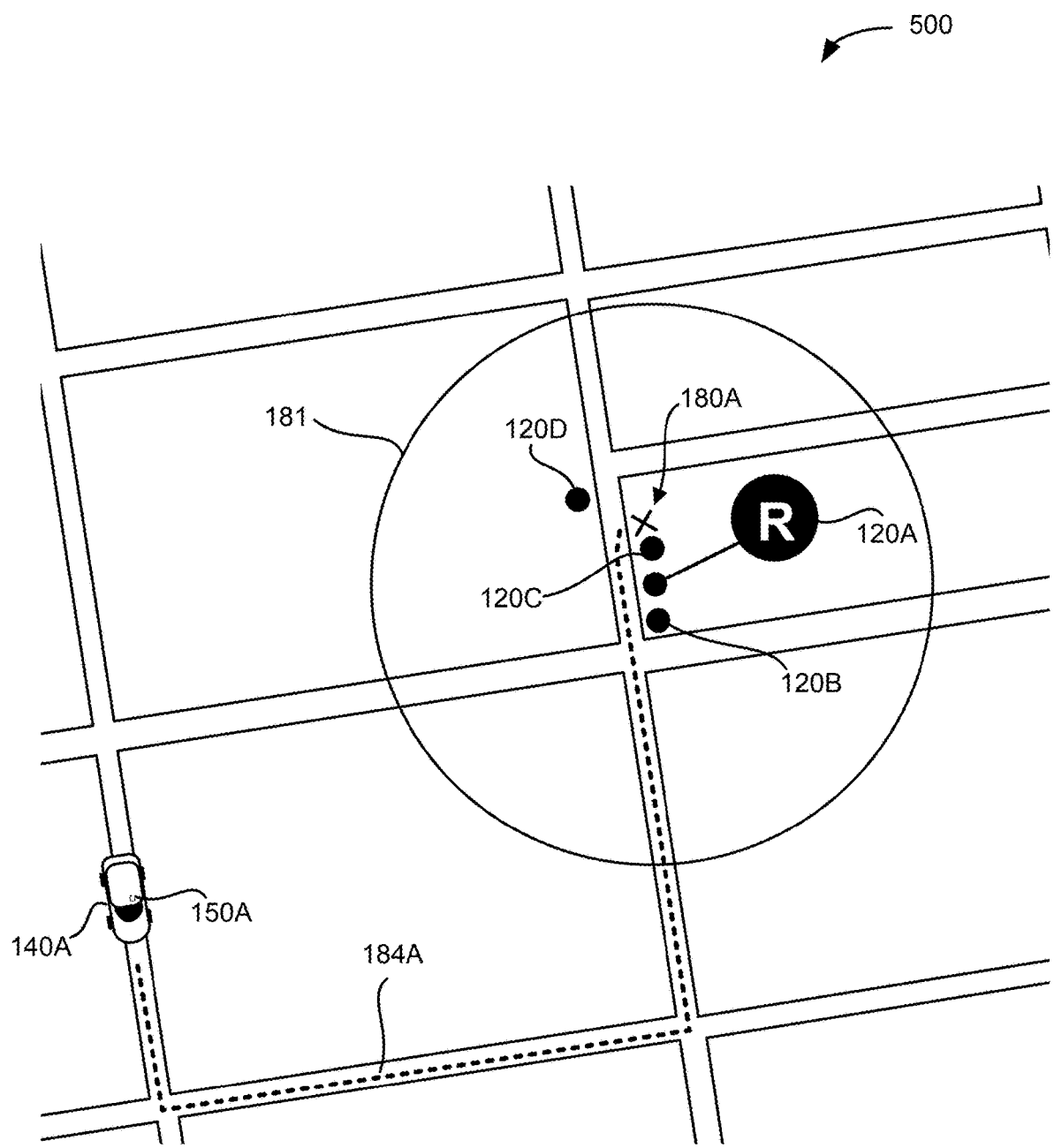
FIG. 5 illustrates a provider navigating to a requestor at a request location amongst a variety of requestors, in accordance with an embodiment of the present techniques.

FIGS. 5-8 illustrate an exemplary method of identifying a location of a requestor computing device upon arrival within communication range 181 of a requestor computing device with multiple requestors 120A-120D present. FIG. 5 illustrates a diagram 500 of a provider 140A and multiple requestors 120A-120D that have matched rides within the same area as a request location 180A, in accordance with an embodiment of the present techniques. As discussed previously, in some embodiments, a provider computing device may be configured to communicate directly with a requestor computing device to identify a triangulation location of the requestor computing device to improve location accuracy of the requestor computing device. As such, once the provider computing device is within communication range of the requestor computing device and/or a request location, the provider computing device may receive signals and/or communications from the requestor computing device that may be used to triangulate the location of the requestor computing device. As such, the provider 140A may be capable of locating and navigating to the location of the requestor where the requestor 110A (and their corresponding requestor computing device 120A) has moved down the street from the request location and is not the nearest requestor to the request location 126A. Accordingly, FIG. 5 shows an example where a provider 140A may arrive at the request location 180A and may be confused as to which requestor is matched with the provider and/or may have difficulty finding the correct requestor 110A.

Figure 6:
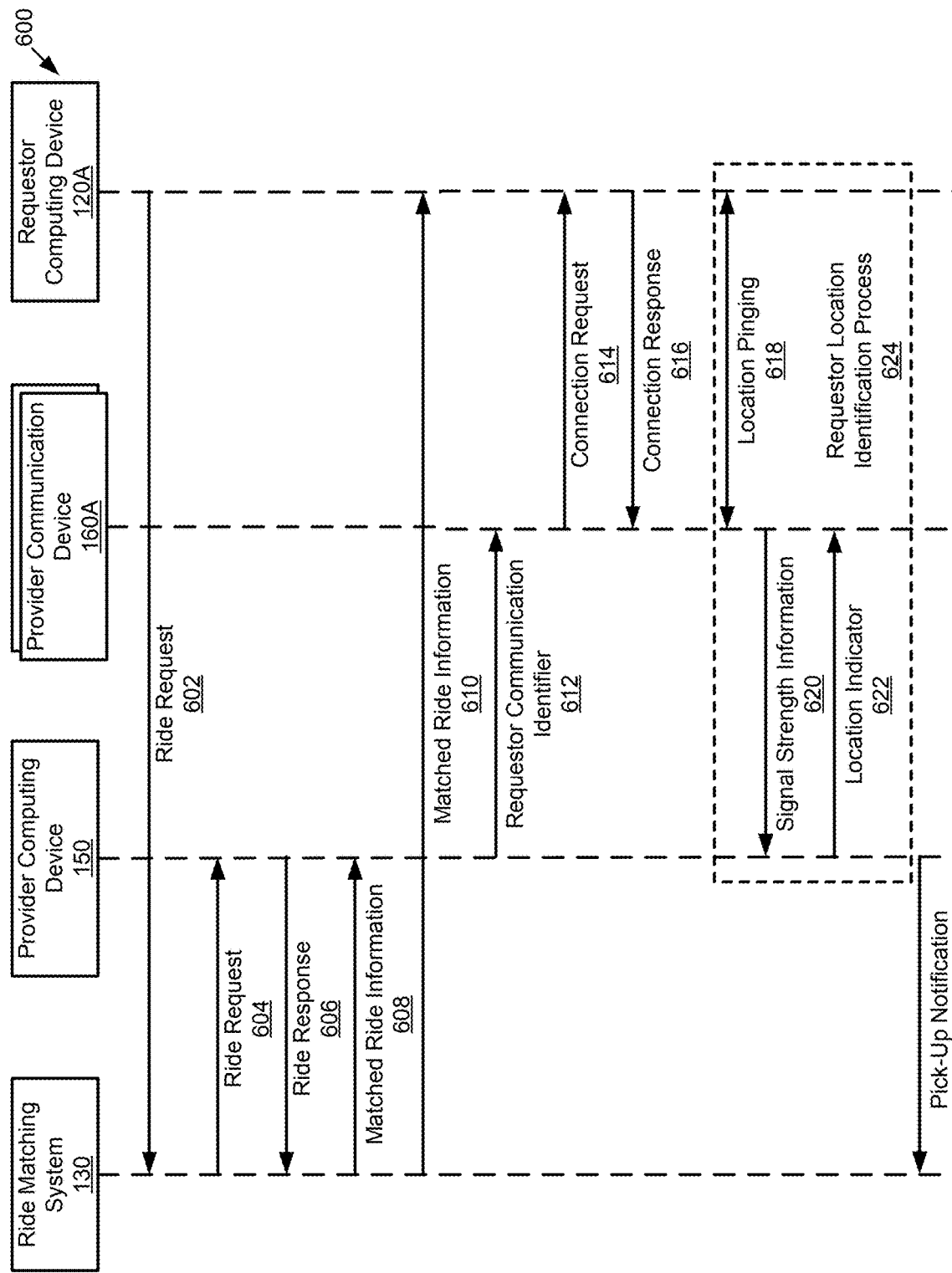
FIG. 6 illustrates an example flow diagram of a requestor location identification process using direct communication between a provider computing device and a requestor computing device, in accordance with an embodiment of the present techniques.

FIG. 6 illustrates an example flow diagram of a requestor location identification process using direct and local communications between a provider computing device 150 and a requestor computing device 120, in accordance with an embodiment of the present techniques. Note that FIG. 6 shows an embodiment where at least one provider device and the requestor computing device are paired. However, pairing is not required for all embodiments and some embodiments as described herein may not pair devices in order to locate a requestor computing device 120.

At step 602 of FIG. 6, the ride matching system 130 may receive a ride request from a requestor computing device 120A that includes a request location 180A for a pick-up. The request location may be entered by the requestor or may include the initial location of the requestor computing device 120 upon initiation of the ride request. The ride request may include a request location (i.e., pick-up location) for the ride request, a requestor identifier, a requestor computing device location, and/or any other relevant information associated with the ride request and/or requestor.

At step 604 the ride matching system 130 may identify an available provider that is near the request location and may send the ride request to the provider computing device. The ride request may include the request location, requestor information, and/or any other relevant information to allow the provider to identify whether they want to accept or decline the ride request. The ride matching system may identify the provider by determining which provider is closest to the request location, has the highest likelihood of accepting the ride request, and/or through any other suitable method. At step 606, the provider may review the ride request, accept the request, and send a ride response including an indicator that the provider accepts the ride request.

At steps 608 and 610, the ride matching system 130 may receive the ride response indicating the provider accepts the ride request, generate matched ride information, and send matched ride information to the provider computing device 150 and the requestor computing device 120. The matched ride information may include any suitable information that may allow the provider and requestor to successfully accomplish the matched ride. For example, the matched ride information may include a communication identifier for the provider and the requestor computing device 120.

At step 612, the provider computing device 150 determines the requestor communication identifier from the matched ride information and provides the requestor communication identifier to one or more provider communication devices 160A-160N located within the vehicle of the provider. A transceiver of each of the provider communication devices 160A-160N may receive a plurality of signals from a variety of requestor computing devices as well as other computing devices that may be sent over the frequency range and are within communication range of the communications module. Each of the signals may be associated with a different communication identifier that identifies a transceiver and/or device that is sending the signal. Accordingly, each of the provider communication devices 160A-160N may identify a signal of the plurality of received signals that is associated with a requestor computing device 120 by comparing the plurality of communication identifiers to the requestor communication identifier. Accordingly, each of the provider communication devices 160A-160N may identify one of the surrounding devices that are sending a communication identifier that matches the requestor communication identifier that was provided in the matched ride information. Thus, each of the provider communication devices 160A-160N may identify a signal being sent from the requestor computing device 120.

At step 614, the one or more provider communication devices 160A-160N identify the signal associated with the requestor computing device 120 and send a connection request to the requestor computing device 120. The connection request may include any suitable information in order to establish a trusted and paired connection between devices. For example, the connection request may include a provider communication identifier for the respective provider communication device 160A-160N and/or the provider computing device 150.

At step 616, the requestor computing device 120 may receive the connection request, authenticate each respective provider communication device 160A, and send a connection response to the respective provider communication device 160A. If the requestor computing device 120 authenticates the provider communication device 160A, the requestor computing device 120 may accept the connection request and may exchange encryption keys and/or otherwise establish a paired connection with the provider communication device 160A. The requestor computing device 120 may authenticate the provider communication device 160A through any suitable manner. For example, the requestor computing device 120 may compare the communication identifier associated with the provider communication device 160A to one or more provider communication identifiers received in the matched ride information to see if a match exists. If a match exists, the requestor computing device 120 may be assured that they are pairing with the correct provider for the matched ride request. Thus, by allowing hardware authentication of the pairing for use in location services, embodiments securely ensure correct matching of requestors and providers at request locations and minimize confusion and mismatches at the point of service. For embodiments with multiple provider communication devices 160A-160N present in the provider vehicle, the requestor computing device 120 may receive multiple provider communication identifiers where each provider communication identifier is associated with a different provider communication device 160A-160N associated with the provider. Note that each of the provider communication devices can perform the pairing process with the requestor computing device 120 such that the requestor computing device 120 is paired with multiple provider devices at the same time.

At step 618, the requestor computing device 120 and the provider communication device 160A perform location pinging by exchanging signals, communication packets, and/or messages over the paired connection. The location pinging can be accomplished through a variety of different methods and communication protocols. Further, the location pinging may include very little information (i.e., a discovery message including each transceivers communication identifier) or may include more information, for example, a type of device, a type of service, location coordinates (e.g., GPS coordinates), etc. Additionally, the location pinging can include one-way or two-way communications mechanisms. For example, upon a pairing connection being established, the requestor computing device 120 may enter a location pinging mode where discovery messages are sent at a high rate to allow the provider communication device to receive and monitor the change in signal strength across the multiple messages to determine a rate of change and/or position over time. Additionally, in some embodiments, a request-response mechanism may be used such that the requestor computing device 120 waits for a location request signal (e.g., location ping request) from the provider communication device before responding with a message and/or location response signal (e.g., location ping response). Either way, the provider communication device and the requestor computing device 120 may exchange messages and/or communications that allow a signal strength measurement to be performed over the paired connection.

At step 620, the provider communication device 160A measures the signal strength of the received location pinging signal from the requestor computing device 120 and sends the signal strength measurement information to the provider computing device 150. In some embodiments, each measured signal strength reading may be sent to the provider computing device 150. In some embodiments, multiple signal strength measurements may be averaged before sending to the provider computing device 150 to smooth inconsistencies and/or noise in the signal strength measurements to ensure a more accurate reading. Accordingly, each of the provider communication devices 160A-160N may report signal strength measurements to the provider computing device 150 upon pairing and/or identification of the requestor computing device 120.

At step 622, the provider computing device 150 receives the signal strength measurements from the one or more provider communication devices and determines a triangulation location of the requestor computing device 120 based on the signal strength measurements received from the one or more provider communication devices. The provider computing device 150 may determine the location information through a variety of different methods. For example, in one embodiment, the provider computing device 150 may use both signal strength readings and geographic location information received from the ride matching system to determine a location of the requestor computing device 120. For instance, the provider computing device 150 may determine a first distance to the requestor computing device 120 based on a signal strength measurement of the signal received from the requestor computing device 120 and may determine a second distance to the requestor computing device 120 based on a geographic location of the requestor computing device 120 received from the rid matching system. The provider computing device 150 may determine a direction to the requestor computing device 120 based on the geographic location of the requestor computing device 120 received from the ride matching system. The provider computing device 150 may then determine a triangulation location of the requestor computing device 120 based on an average of the first distance and the second distance to the requestor computing device 120 and using the direction to the requestor computing device 120. Accordingly, the provider computing device 150 may use both reported location information from the ride matching system for the requestor computing device 120 as well as the direct communication signal strength to determine a triangulation location for the requestor computing device 120.

Additionally and/or alternatively, in some embodiments, the provider computing device 150 may determine a triangulation location for the requestor computing device 120 by triangulating the location of the requestor computing device 120 using signal strength measurements from two or more provider communication devices. For example, the provider computing device 150 may determine two or more different distances to the requestor computing device 120 based on two or more different signal strength measurements of signals received from the two or more provider communication devices. The provider computing device 150 may determine the triangulation location of the requestor computing device 120 based on an intersection of the first distance, the second distance, and the third distance to the requestor computing device 120 from the location of each of the provider communication devices. Additionally, in some embodiments, the provider computing device 150 may also pair and determine a signal strength measurement of a signal received from the requestor computing device 120. As such, the provider computing device 150 may use signal strength measurements from multiple transceivers located in different locations throughout the vehicle to determine a triangulation location for the requestor computing device 120.

Once the provider computing device 150 determines a triangulation location for the requestor computing device 120, the provider computing device 150 may provide a location indicator to one or more of the provider communication devices to display a location to the provider. The provider may navigate to the triangulation location using the location indicator. Any suitable location indicator may be used such as a location may be presented on a map being displayed through the provider communication device and/or the provider computing device 150 to the provider. Accordingly, a more accurate location based on the signal strength of communications between the provider computing device 150 and the requestor computing device 120 may be used to identify a location of the requestor.

At step 624, the location pinging between the provider communication devices and the requestor computing device 120, signal strength measurement reporting to the provider computing device 150, and the determination and presentation of a triangulation location for the requestor computing device 120 may be repeated as a requestor location identification process. The requestor location identifier process may be repeated until the requestor and provider find one another and the requestor is picked-up. Accordingly, the triangulation location of the requestor may be updated over time as the provider moves toward or away from the requestor. As such, as the provider arrives at the request location, the provider may be notified as to the exact location of the requestor and may quickly and easily identify the exact location of the requestor.

At step 626, the requestor is picked up and the provider computing device 150 sends an arrival or pick-up notification to the ride matching system. The ride may now begin and/or the service may be provided to the requestor.

Figure 7:
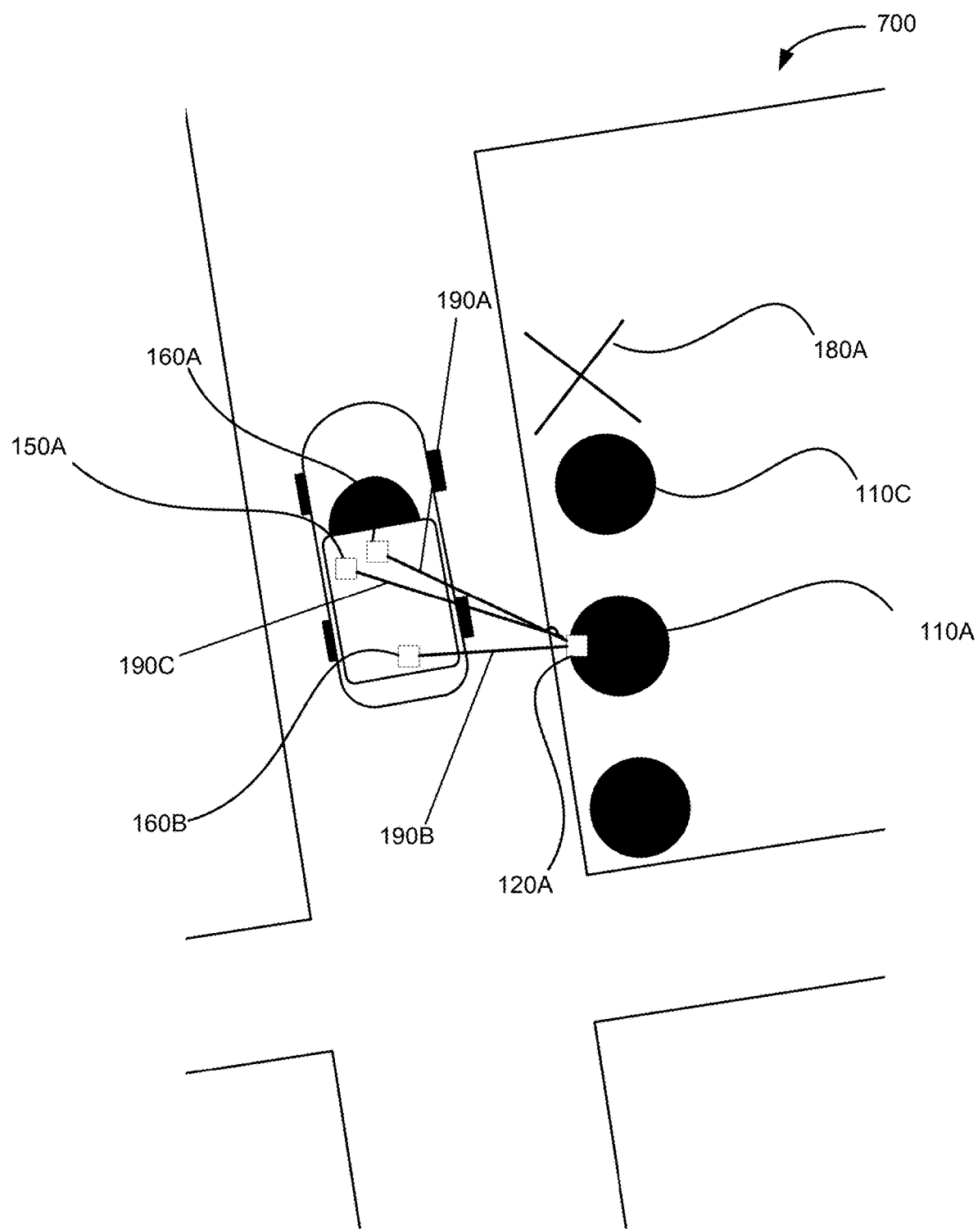
FIG. 7 illustrates a provider locating a requestor at a request location based on direct communications between one or more provider devices and the requestor device, in accordance with an embodiment of the present techniques.

FIG. 7 illustrates a provider locating a matched requestor amongst a plurality of requestor computing devices 120A-120C at a request location 180A based on direct communications between one or more provider devices 150A, 160A-160B and the requestor device 120A, in accordance with an embodiment of the present techniques. FIG. 7 shows an example embodiment where the provider has two provider communication devices 160A-160B and one provider computing device 150A communicating with the requestor computing device 120A. In this example, each of the provider communication devices 160A, 160B are located at different locations within the provider vehicle to maximize the differences in signal strength readings to assist in accurate triangulation of a location of the requestor computing device 120A. For example, a first provider communication device 160A is located at the front of the vehicle while a second provider communication device 160B is located at the rear of the vehicle. This allows for different signal strength readings to be measured for the same requestor computing device 120A. Signal strength radii 190A-190C are measured at the different provider devices based on the distance between each of the provider communication devices 160A-160B and the provider computing device 150A with respect to the location of the requestor computing device 120A. The requestor computing device 120A may send one or more signals at a constant and known power level that may be used to map received signal strength to a known distance from the receiver location of the respective provider devices.

As can be seen in FIG. 7, the requestor computing device 120A associated with the ride request is not located at the request location 180A. Instead, the requestor computing device 120A is down the block from the request location and there is another requestor 110C with a requestor computing device that is closer to the request location 180A. As such, upon arrival near the request location 180A, the provider may not be able to easily find the requestor at the request location 180A. As explained above, the provider computing device and the corresponding provider communication devices (also referred to as the provider devices) may identify the requestor computing device using the requestor communication identifier. The provider devices may exchange location pinging messages with the requestor computing device as the provider approaches the request location and may determine a signal strength at each of the transceivers within the provider devices.

The signal strength radii 190A-190C show a distance from the requestor computing device based on different signal strength readings that the respective devices receive from the requestor computing device. The provider computing device may receive the three different signal strength measurements associated with the different devices and triangulate a requestor computing device using the signal strength readings. For example, the provider computing device may determine an intersection point for each of the signal strength radii associated with the received signal strength readings and the known location of the provider devices. Accordingly, the provider computing device may receive the signal strength readings and triangulate the location of the requestor computing device by finding an intersection point of the signal strength radii for each of the signal strength measurements from each of the provider devices.

The more provider devices the more accurate the triangulation may be but useful location information may be obtained by as few as a single provider device. For example, a reported requestor computing device location may be combined with signal strength readings from a single device to provide more granular location information than may be possible with a GPS location service in a high interference environment or topology. As such, the signal strength readings and corresponding signal strength radius associated with a single device may be combined with the known requestor computing device location reported by the ride matching system to hone in on the exact location of the requestor at a level of detail that is otherwise unavailable in such high interference environments. Moreover, by using signal strength readings from two or more devices, signal strength radii may be generated and used to determine location information that can be used to assist in accurately finding the requestor computing device without a known location for the requestor computing device.

Figure 8:
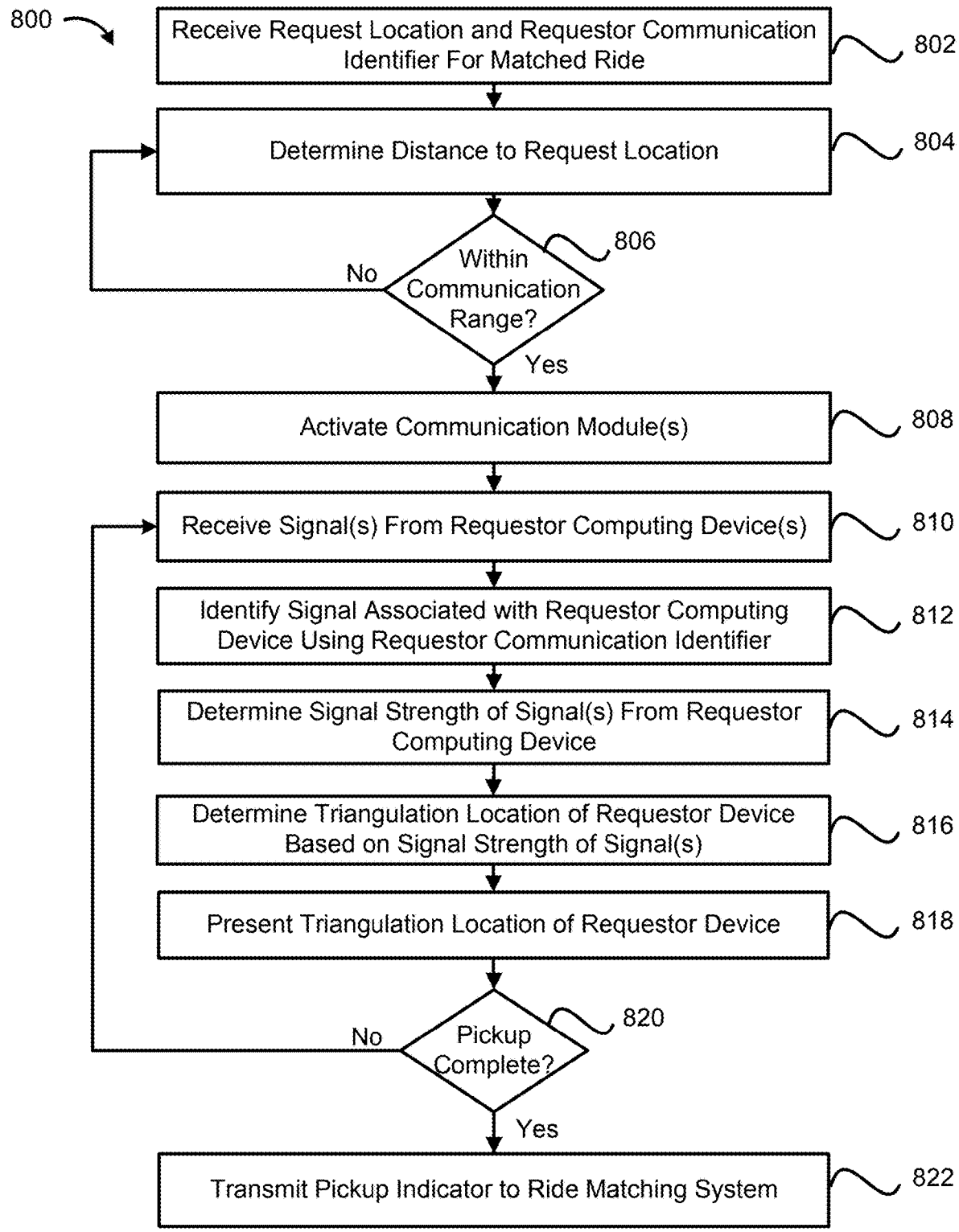
FIG. 8 illustrates an example flow diagram of a requestor location identification process using direct communication between a provider computing device and a requestor computing device, in accordance with an embodiment of the present techniques.

FIG. 8 illustrates an example flow diagram of a requestor location identification process using local and direct communication between a provider computing device and a requestor computing device, in accordance with an embodiment of the present techniques. Note that the process described in FIG. 8 shows an embodiment where the devices are not paired to communicate information and instead use discovery and/or location pinging messages to identify the location of the requestor computing device. However, note that in other embodiments, a pairing may be completed and information may be exchanged over one or more paired connections.

At steps 802 and 804, the provider computing device may receive matched ride information for a matched ride request, determine the location of the provider computing device, and determine a distance to the request location. The provider computing device may obtain the location using GPS components and/or other location service components of the provider computing device. In some embodiments, the ride matching system may identify a location of the provider computing device 150A and map a navigation route 184A from the location of the provider computing device 150A to the request location 120A and provide the navigation route in the matched ride information. The provider computing device may use the navigation route including traffic information, road closures, and road conditions to determine a distance to the request location. For example, the provider computing device may determine that the provider is 2 blocks away, 3 minutes away, half a mile away, and/or any other measure of distance or arrival time from the request location.

At step 806, the provider computing device determines whether the provider computing device is near the request location by comparing the determined distance to the request location to a threshold distance. The threshold distance may be preconfigured based on the geographic location, city, region, requestor and provider profile information (e.g., type of communications components associated with the computing devices), and/or any other conditions associated with the matched ride. For example, the threshold distance may be associated with a communication range of the provider devices and/or the requestor device to conserve system resources where the provider is outside of communication range with any requestor that is located near the request location. Additionally, different geographic regions may have different navigation settings based on local preferences of providers. For instance, the threshold distance may include 1 block, 100 yards, and/or 1 minute. If the provider computing device determines that the provider is not near the request location by being within the threshold distance, the provider computing device updates the location of the provider computing device and determines a new distance to the request location (step 904). This process continues as the provider approaches the request location until the provider computing device is within a threshold distance associated with the communication range of the devices to the request location.

At step 808, the provider computing device may activate the communication module of the provider computing device and/or the provider communication devices as the provider is within communication range of the request location. In some embodiments, the ride matching system may monitor the location of the provider computing device and/or receive a notification from the provider when near communication range of the request location and may send a message to the requestor computing device to activate the communications module of the requestor computing device as well.

At step 810, the communications module of the provider computing device and the associated provider communication devices receive a variety of signals from a variety of requestor computing devices and other devices within communication range that are sending signals in the frequency range of the transceiver of the provider computing device. The provider computing device and the provider communication devices each analyze the received signals to identify a signal associated with the requestor computing device. The provider computing device and the provider communication devices each compare communication identifiers associated with each of the received signals to identify a signal that is associated with the requestor computing device. Each of the signals may be associated with wireless data that includes a packet of information having a communication identifier that uniquely identifies a transceiver or device associated with the signal. Accordingly, by comparing the communication identifiers associated with the received signals, the provider computing device may identify a signal associated with the requestor computing device amongst the variety of received wireless messages, signals, and/or information.

At step 814, the provider computing device and the provider communication devices may determine a signal strength of each signal received from the requestor computing device. The provider communication devices may send the signal strength readings for each respective provider communication device to the provider computing device. In some embodiments, the transceivers may receive multiple signals, determine the signal strength of each of the signals, and average them to generate a single signal strength reading to be provided to the provider computing device. In other embodiments, each signal strength reading may be reported to the provider computing device.

At step 816, the provider computing device receives the signal strength readings associated with each provider communication device and determines a triangulation location of the requestor computing device based on the signal strength readings of the one or more signals. The provider computing device may determine a triangulation location through a variety of different methods. For example, the provider computing device may use a reported requestor location from the ride matching system to assist in identifying the triangulation location and/or may only rely on the signal strength readings. In some embodiments, the provider computing device may convert the received signal strength readings to signal strength radii or known distances associated with the signal strength readings from the location of the provider devices and may triangulate the respective signal strengths from the different locations to a location that intersects the different distances from the respective locations of the provider devices. In some embodiments, the provider computing device may use the signal strength distance and a distance based on the reported requestor computing device location from the ride matching system to average the distance between the two readings. Either way, a triangulation location is determined using the one or more signal strength readings determined from one or more communications received from the requestor computing device.

At step 818, the provider computing device presents the triangulation location to the provider. The provider computing device may present the location in any suitable method and through any suitable format. For example, the location may be presented as coordinates, mapped to a street address, reported as a distance from the current location of the provider computing device, and/or through any other suitable method. The location may be provided through speakers, displayed on a screen, presented through a virtual reality or augmented reality interface, and/or through any other suitable method.

At step 820, the provider computing device determines whether the pickup has been completed. The provider computing device may determine whether the pickup is complete through any suitable method. For example, the provider computing device may determine whether the provider computing device and the requestor computing device are in the same location (i.e., within the same vehicle). Additionally and/or alternatively, the provider computing device may receive an input from the provider indicating that the requestor has arrived at the provider or entered the vehicle. Additionally and/or alternatively, the provider computing device may receive a notification from the ride matching system showing that the requestor has indicated that they have been picked up. If the provider computing device determines that the pick-up has not been completed, the provider computing device repeats steps 814-820 to identify an updated location of the requestor computing device based on further communications and signal strength measurements. This repeats until the provider application identifies that a pick-up has been completed.

At step 822, the provider computing device determines that the pick-up is completed and sends a pick-up indicator to the ride matching system to indicate that the matched ride has begun. At this point the requestor is in the vehicle or the on-demand service has otherwise begun and the ride matching system tracks the status associated with the ride and the provider may travel to the destination location associated with the matched ride.

II. Proximity Vector Navigation Using Local Communication

Figure 9:
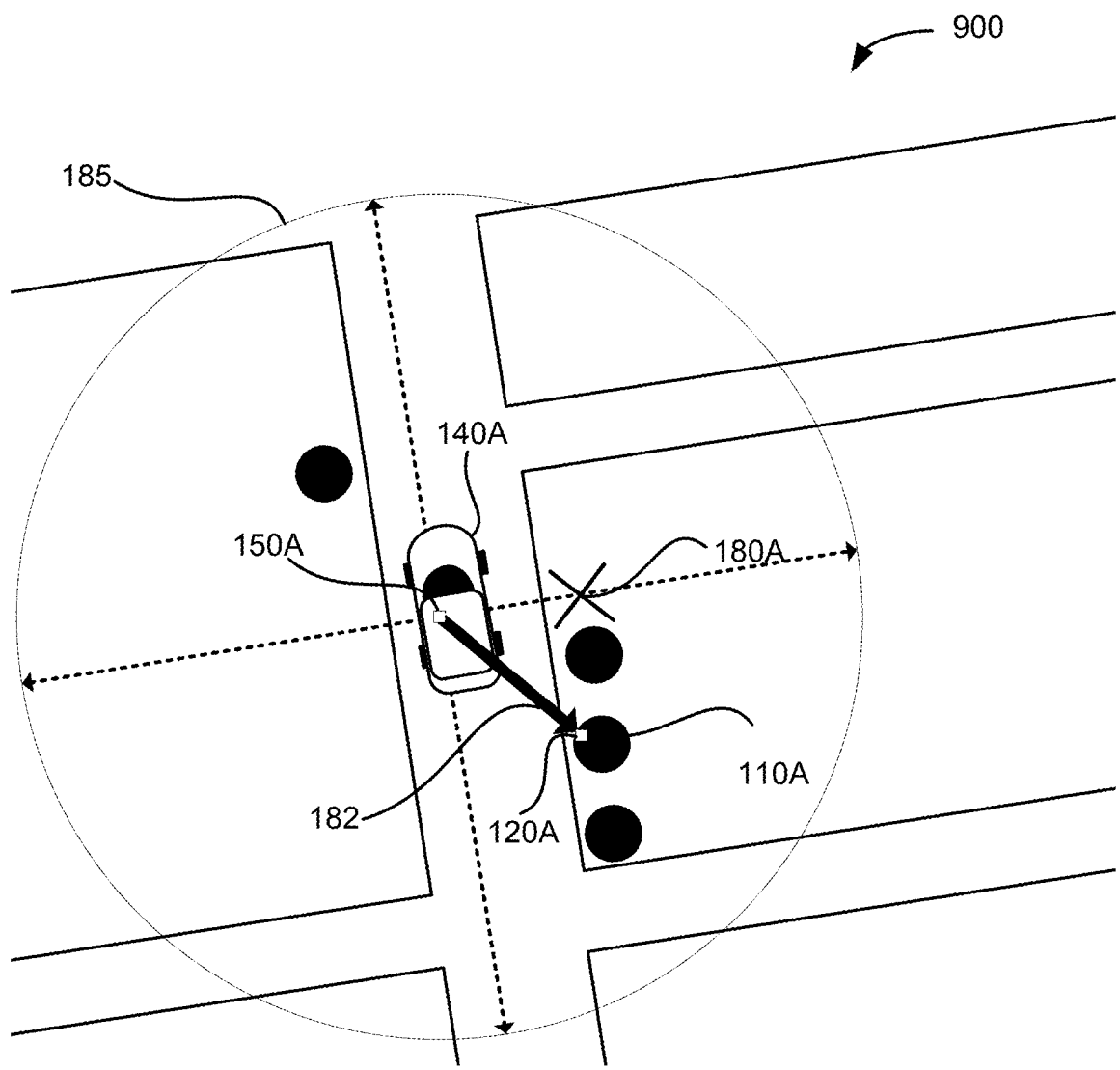
FIG. 9 illustrates a provider locating a requestor at a request location amongst a variety of requestors based on a proximity vector between the provider device and the requestor device, in accordance with an embodiment of the present techniques.

In some embodiments, the requestor computing device location triangulation process described herein may be used to identify an accurate location of a requestor computing device and generate accurate proximity vectors to navigate a provider to an exact location of a requestor. For example, FIG. 9 shows an example diagram 900 of a provider 140A once an accurate location has been determined using the methods described above. The provider computing device may determine an accurate triangulation location for a requestor computing device and determine a proximity vector 182 using a difference between a location of the provider computing device 150A and the triangulation location of the requestor computing device 120A.

The proximity vector 182 may be determined by calculating a magnitude and a direction of the difference between the location of the provider computing device and the triangulation location of the requestor computing device. Reference coordinate axes 185 with an origin at the location of the provider computing device may be used to identify the direction and magnitude of the proximity vector. The reference coordinate axis may be defined such that 0 degree reference axis is the direction that the vehicle is facing and/or traveling. For example, as shown in FIG. 9, the reference coordinate axes 185 may be determined in reference to the front of the vehicle with an origin of the reference coordinate axes 185 present at the location of the provider computing device 150A. As such, in the example shown in FIG. 9, the direction of the proximity vector may be determined to be between 90 degrees and 180 degrees of the front of the vehicle. An exact direction may be determined, for instance, as 133 degrees. The magnitude may be determined by identifying the hypotenuse of the x and y coordinates of the triangulation location of the requestor computing device in reference to the origin of the axes located at the location of the provider computing device. Thus, the magnitude may be calculated using the algorithm $v=\sqrt{x^2+y^2}$ and the direction may be calculated by taking the inverse tangent of the location y/x in reference to the location of the provider computing device. Accordingly, the direction and magnitude of the vector can be calculated using the x and y coordinates of the requestor computing device in relation to the location of the provider computing device.

Once the proximity vector is determined, the provider computing device 150A may identify a proximity indicator associated with the proximity vector. For example, the provider computing device 150A may determine that the first proximity vector is associated with a particular proximity identifier that corresponds to a graphic that shows the direction in which the provider should navigate in order to find the triangulation location of the requestor computing device.

Figure 10:
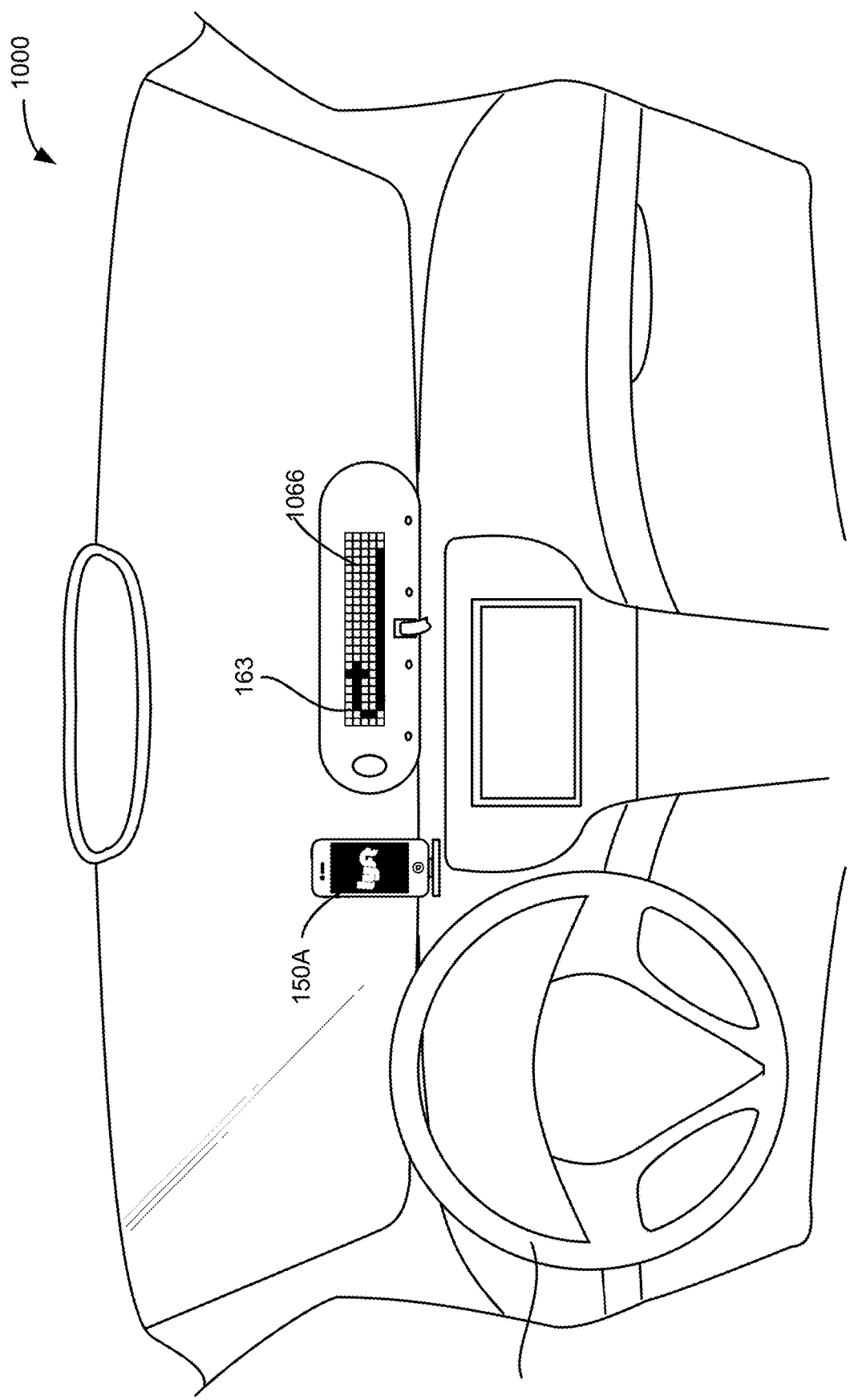
FIG. 10 illustrates an example of an environment from the view point of a provider at a request location, in accordance with an embodiment of the present techniques.

FIG. 10 illustrates an example of an environment 1000 from the view point of a provider at a request location where the provider communication device is displaying a proximity indicator 1066 associated with the proximity vector of the example shown in FIG. 9. As shown in FIG. 10, the provider can quickly and easily determine that the requestor is located behind them by looking at the graphic (i.e., pattern, color, etc.) displayed on the rear display 163 of the provider communication device 160. Accordingly, the provider may navigate to the requestor by turning around, backing up, and/or may flag down the requestor once the location of the requestor is known. Additionally, as the provider arrives near the request location the proximity indicators may start displaying such that the provider may not move past the requestor location as they will get feedback before arriving at the request location and can easily find the requestor upon arrival near the request location.

In some embodiments, the graphics associated with the proximity indicator may be triggered to be presented upon determining that the magnitude of the proximity vector is below a display threshold amount. For example, if the requestor computing device is too far away from the provider computing device to display relevant information to find the requestor, the system may wait to display a relevant proximity indicator until the provider computing device is within a particular display distance threshold of the requestor computing device even if the proximity vector has been determined. Accordingly, in some embodiments, a proximity indicator may not be displayed until the provider is within a threshold distance of the requestor so that the proximity indicators may be helpful in finding the exact location of the requestor computing device. For instance, if the magnitude of the proximity vector indicates that the requestor is over a block away, 100 yards away, and/or over any other relevant display distance threshold, the proximity indicator may not be displayed.

Additionally and/or alternatively, in some embodiments, the proximity indicator may only be displayed upon an event or condition being met. For example, in some embodiments, upon arrival at a request location, the provider may press an arrived button or other input on the provider application 151 of the provider computing device 150 and only upon arrival will the proximity indicators be displayed for navigation to the exact location of the requestor computing device. As such, when the arrival input is received by the provider application 151 of the provider computing device 150, the interactive display module may cause the graphics associated with the proximity indicator to be displayed on the displays of the provider computing device 150 and/or the provider communication device 160.

FIGS. 11A-11F show a rear view of the provider communication device 160 having a rear body, a rear display 163, a power button 167, background lighting 164A-164D, and a device input 168. The rear display is configured to display instructions, greetings, directions, proximity indicators, and/or any other suitable information to those in a vehicle and/or behind the vehicle. For instance, the rear display 163 may be configured to instruct a provider with navigation directions to a requestor, may show a greeting to the requestor as they enter the vehicle, may display a proximity indicator to help the provider that arrives in the vehicle to find the exact location of the requestor computing device and/or any other suitable purpose for displaying information to the provider and/or requestor. The rear display 163 may include an array of LEDs and/or any other suitable lighting source that may be capable of displaying multiple colors, patterns, graphics, images, animation, and/or any other perceivable information to a requestor and/or driver. The background lighting 164A-D may include one or more independent light sources that are pointed in a downward direction to allow a cloud of light to fill the dashboard and/or front driving area of the vehicle. The background lighting 164A-D may be separate and distinct colors and/or patterns from the front and rear display and/or may match the pattern and/or colors displayed on the front and/or rear display.

The power button 167 may allow a provider to quickly and easily turn the provider communication device 160 on or off and may have a sleep mode and/or other settings interface for the driver to interact with the provider communication device 160. The device input 168 may include any suitable power input 168 and/or data input 168 to allow one or more other devices and a power supply to be provided to the provider communication device 160. The provider communication device 160 may receive power from an independent battery and/or from a power supply of the vehicle. The data input 168 may allow the provider computing device 150 to send information to the provider communication device 160 and/or the provider communication device 160 may include a wireless communication element that allows the provider computing device 150 to communicate with the provider communication device 160. For example, Bluetooth™ and/or other short range communication protocols may be used to link and/or pair the provider communication device 160 and the provider computing device 150.

Figure 11A:
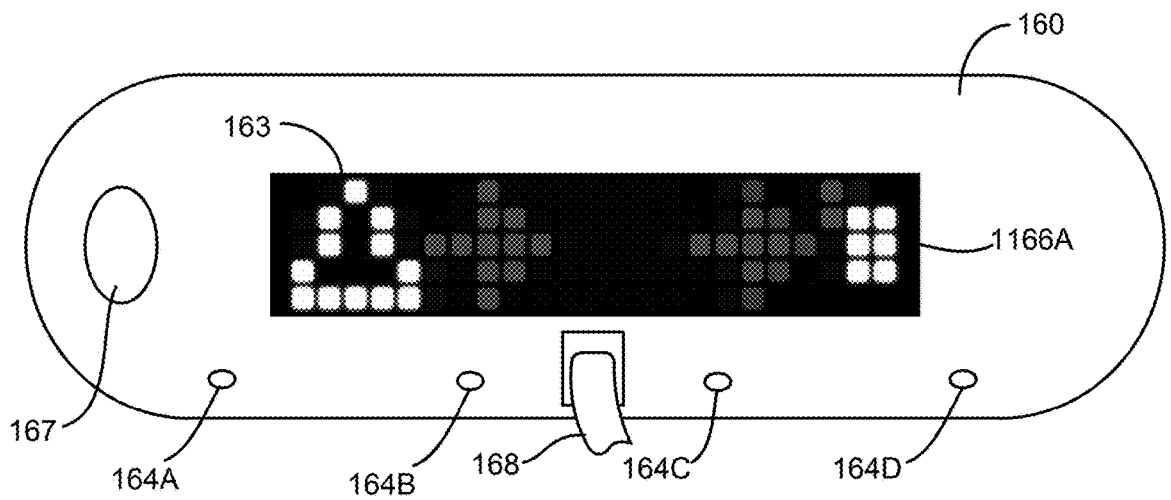
FIGS. 11A-11F illustrate an exemplary provider communication device showing different proximity indicators on a rear display of the provider communication device, in accordance with an embodiment of the present techniques.

FIGS. 11A-11F illustrate an exemplary provider communication device 160 showing different views of an animated proximity indicator 1166A-1166F on a rear display 163 of the provider communication device 160, in accordance with an embodiment of the present techniques. Proximity indicators may include any suitable format, form, design, and/or information to allow a provider to locate and navigate to a requestor location. In some embodiments, the proximity indicators may include an animation with different phases showing a relative direction and/or proximity to the requestor computing device. In such embodiments, different portions of an animation sequence may be shown for different distances and/or directions to the request location and/or the requestor computing device. For example, FIG. 11A shows a first phase of an animated proximity indicator 1166A being presented on a rear display 163 of the provider communication device 160. The first phase of the proximity indicator animation 1166A may be associated with the provider computing device traveling toward the request location and may be displayed when the distance between the provider computing device and the request location is over a particular long-distance threshold amount (e.g., 1 mile, 10 blocks, etc.). The first phase of the proximity indicator animation indicates that the provider is traveling toward the requestor.

Figure 11B:
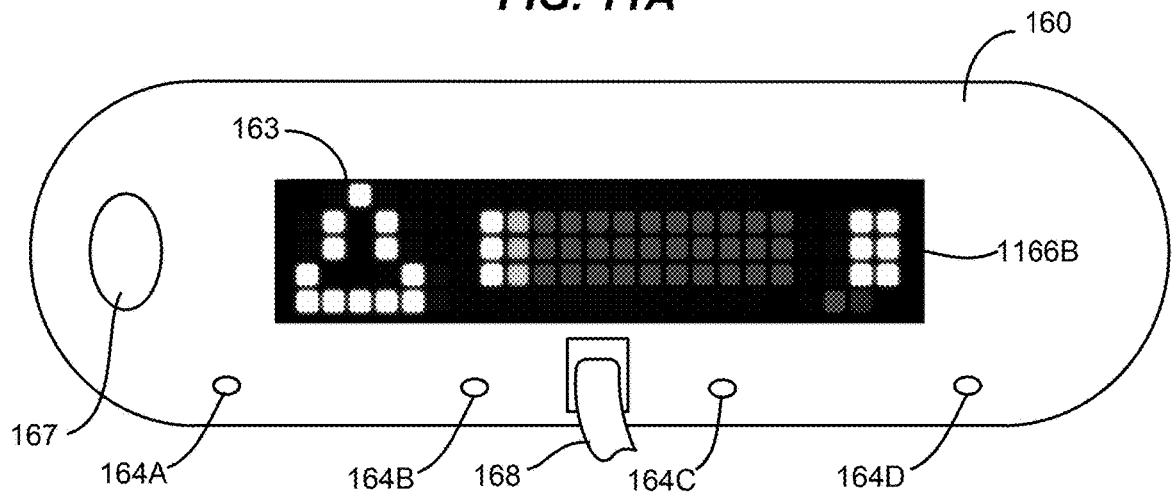
Figure 11C:
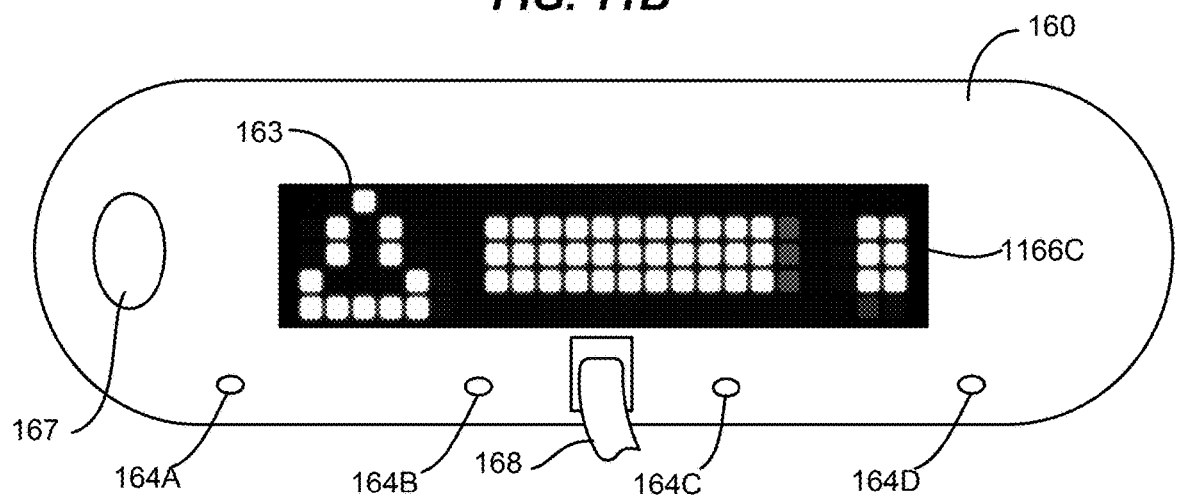

FIG. 11B shows a provider communication device 160 having a second phase of an animated proximity indicator 1166B being displayed on the rear display 163 of the provider communication device 160. The second phase of the proximity indicator may be triggered once within the long-distance threshold amount. The second phase of the proximity indicator may set a reference distance to the request location and/or requestor computing device that allows the provider visual feedback regarding how close they are to the triangulation location of the requestor computing device and/or request location. For example, the animated display shows a graphical representation of a provider on a left side of the display, a graphical display of a requestor on the right side of the animation, and a reference distance grid in between the provider and the requestor in the middle. As the provider gets closer to the location of the requestor, the visual grid may fill to indicate that the provider is getting closer to the location of the requestor and/or request location. FIG. 11C shows a provider communication device 160 displaying a second phase 1166C of the animated proximity indicator where the provider is closer to the requestor than the proximity indicator shown in FIG. 11B. Accordingly, the magnitude of the proximity vector between the provider and the requestor for the proximity vector in FIG. 11C is smaller than that of FIG. 11B. In some embodiments, the second phase of the proximity indicator 1166C may be used as the provider is approaching the request location but before they arrive within the distance threshold of the request location to indicate the provider is getting closer but is not within a particular distance of the request location yet. Any other sequence of threshold distance levels and/or distances may be configured to correspond to the various animated sequence of images displayed by the different phases of the animated proximity indicator.

Figure 11D:
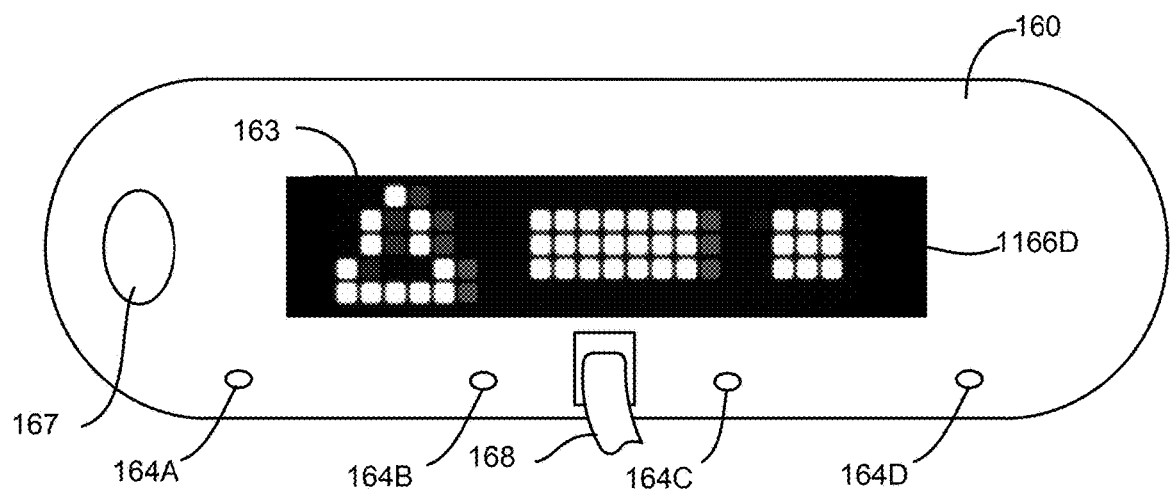
Figure 11E:
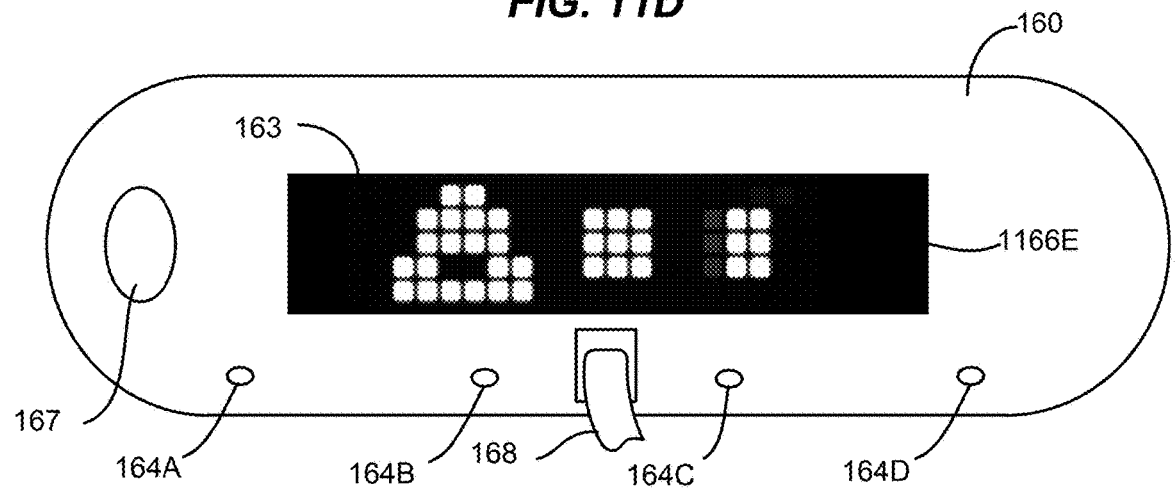
Figure 11F:
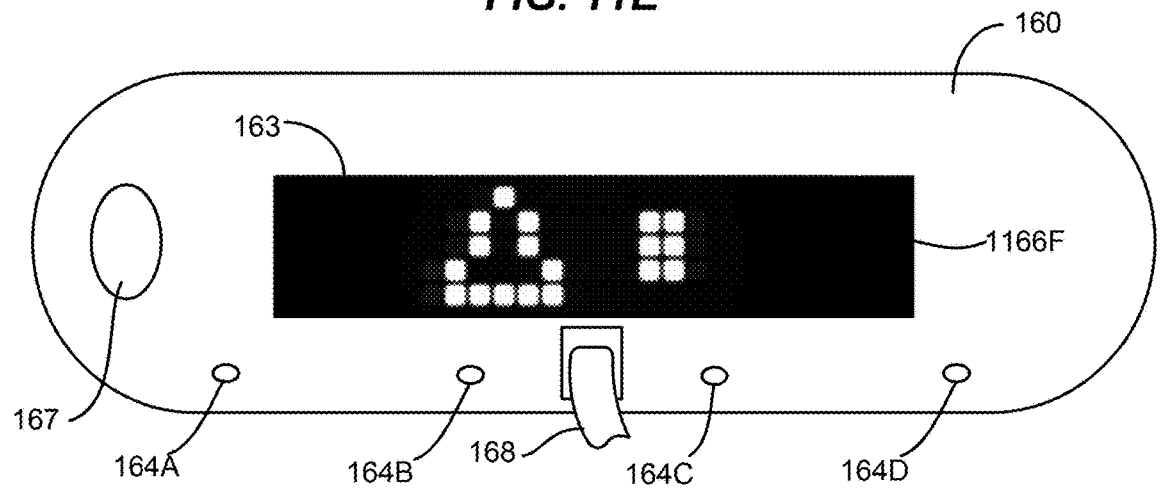

FIG. 11D shows a third phase of the animated proximity indicator 1166D where the provider is within the distance threshold of the request location and may be approaching the triangulation location of the requestor. Accordingly, the distance grid between the graphical representation of the provider and the requestor has filled completely and starts to get smaller indicating that the distance between the requestor and the provider is getting smaller. Similarly, FIG. 11E shows the third phase of the animated proximity indicator 1166E where the provider is even closer to the requestor computing device and/or request location than in FIG. 11D. Once the distance grid shrinks and disappears, the proximity indicator is indicating that the provider is at the triangulation location of the requestor computing device. FIG. 11F shows the fourth phase of the animated proximity indicator 1166F where the distance grid has completely disappeared and the provider is at the request location and/or the requestor computing device location. In some embodiments, the graphical representations of the provider and the requestor in the proximity indicator 1166F may flash back and forth to indicate that the locations are matching or are very close and the contact may be made soon between the two parties.

As such, as the magnitude of the proximity vector gets smaller as the provider travels towards the requestor location and/or the request location, an animated proximity vector may be configured to provide feedback to the driver to allow the driver to locate the requestor as efficiently and quickly as possible. In some embodiments, the proximity vector may start between the provider computing device and the request location and may later shift to the distance between the requestor computing device and the provider computing device. Thus, different reference points, locations, distances, and proximity vector magnitudes may be displayed through the animated proximity vector in order to save resources and locate the requestor in the most efficient manner possible without unnecessarily using system resources.

Figure 12A:
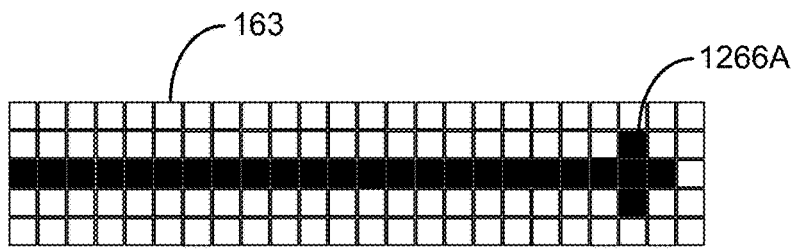
FIGS. 12A-12E illustrate exemplary proximity indicators configured to be presented on a rear display of the provider communication device and corresponding proximity vectors, in accordance with an embodiment of the present techniques.
Figure 12A:
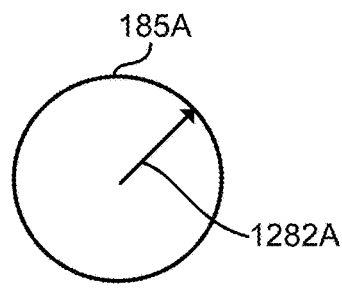
Figure 12B:
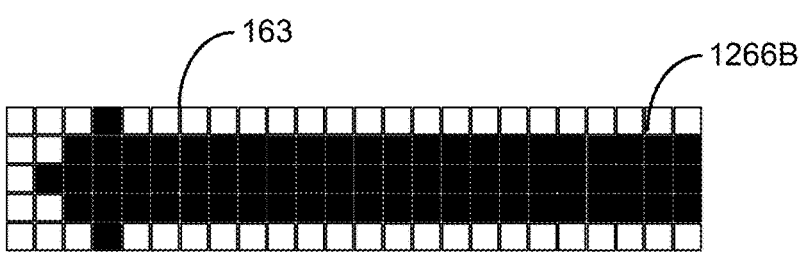
Figure 12B:
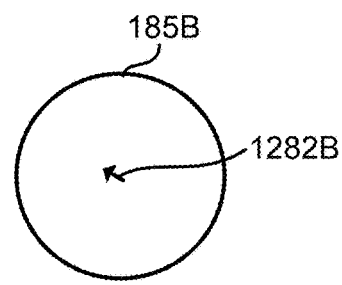

Additionally and/or alternatively, in some embodiments, the proximity indicators may show both direction and distance and may include navigation instructions for finding the triangulation location of the requestor computing device to the provider. For example, FIGS. 12A-12E illustrate different proximity indicators 1266A-1266E that can be shown on a rear display 163 of a provider communication device 160 and their corresponding proximity vectors 182A-182E, in accordance with an embodiment of the present techniques. FIG. 12A shows a proximity indicator having an arrow indicating the triangulation location of the requestor computing device to the provider within the rear display 163 of the provide communication device (not shown). The corresponding proximity vector 182 showing the direction and magnitude of the requestor computing device is shown as well for reference as to how the proximity indicator 1266 can be associated with the magnitude and direction of the proximity vector 182. For instance, the width of the arrow may indicate how near or far the provider computing device is to the triangulation location of the requestor computing device. As such, a small width arrow may indicate that the provider is relatively far from the requestor and the arrow may get wider as the provider moves closer to the triangulation location of the requestor computing device. Additionally, the direction of the arrow may indicate which direction the requestor computing device is located in to instruct the provider on which side of a street to park and/or in which direction to travel. Accordingly, in some embodiments, the proximity indicator may include information regarding the distance and direction in which the requestor computing device is located. The provider may use this information to navigate to the triangulation location of the requestor, even when the requestor is not at the request location. In some embodiments, the proximity indicator may be animated such that the arrows move from left to right and/or get larger and smaller as the provider approaches the requestor location.

Figure 12C:
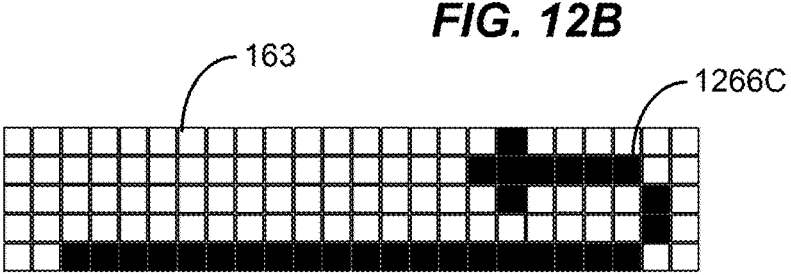
Figure 12C:
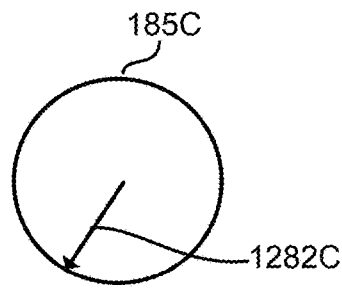
Figure 12D:
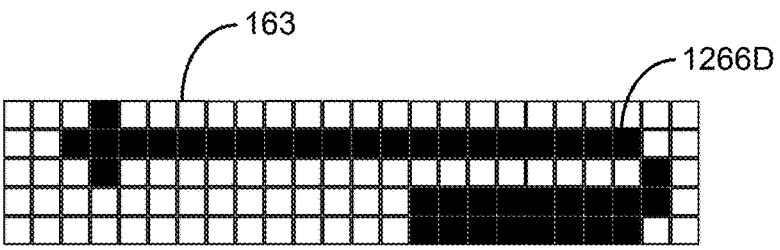
Figure 12D:
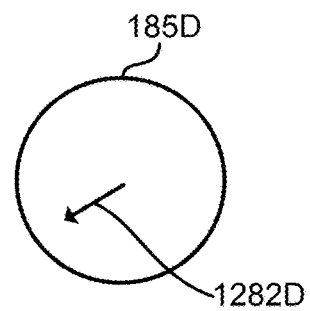
Figure 12E:
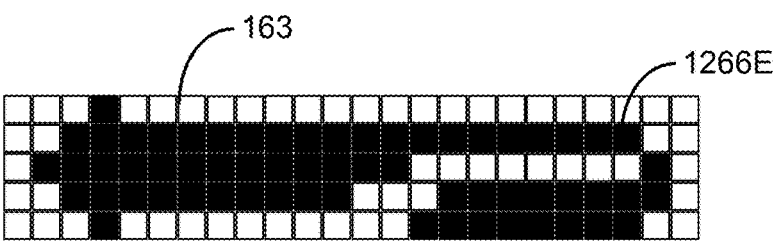
Figure 12E:
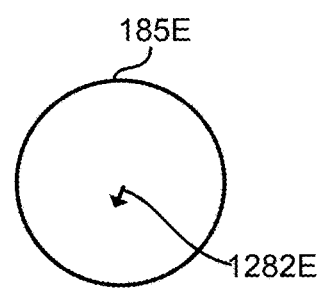

Further, some proximity indicators may indicate that the requestor location is behind the provider location. For example, FIGS. 12C-12E show proximity indicators with arrows that have a turn associated with them to indicate that the requestor is located behind the provider. Further, the width of the tail end or the pointed end of the arrow may indicate how near or far behind the provider the requestor is located. For instance, how far behind the provider that the requestor is located can be indicated as part of the tail portion of the arrow. For example, as shown in the difference between FIGS. 12C and 12D, the direction of the requestor triangulation location in the rear direction may be indicated by the width of the tail of the proximity indicator arrow. For instance, the width of the tail end of the backwards arrow in FIG. 12D is much wider than the tail end of the proximity indicator of FIG. 12C because the requestor is located at a closer location as far as the direction of the proximity indicator in FIG. 12D. As can be seen in FIG. 12E, where the requestor is located close behind the provider, the tail portion and the pointed portion of the arrow may be fat to indicate the distance is small both behind and in direction to the requestor. Accordingly, in some embodiments, the proximity indicators may include multiple levels of information in an intuitive and predictable manner for a provider to interpret.

The rear display of the provider communication device may include any suitable display element to generate the proximity indicator. For example, the rear display may include a LCD display that may generate the proximity indicator by using a mixture of light and dark pixels on the rear display. Any other suitable display technology may be used including rear projection, an array of LEDs, etc. Additional proximity indicators may include different patterns, color regions, horizontal lines, vertical lines, and/or any other suitable combinations of light that may indicate directions and/or relative distance to a provider and/or requestor. The proximity indicators may be generated through combinations of physical elements (a rear display cover) and background lighting or through a combination of dark and light pixels on a single display (e.g., LCD display). Patterns may also be projected onto a surface and/or may be provided through an augmented reality (AR) view provided through the computing devices. The proximity indicators shown herein are merely examples of some indicators that can be generated and displayed in some embodiments and the proximity indicators are not limited to those shown. For instance, in some embodiments, proximity indicators may include stripes, dark horizontal lines of different color, images, icons, brands, graphics, animations, etc.

Figure 13:
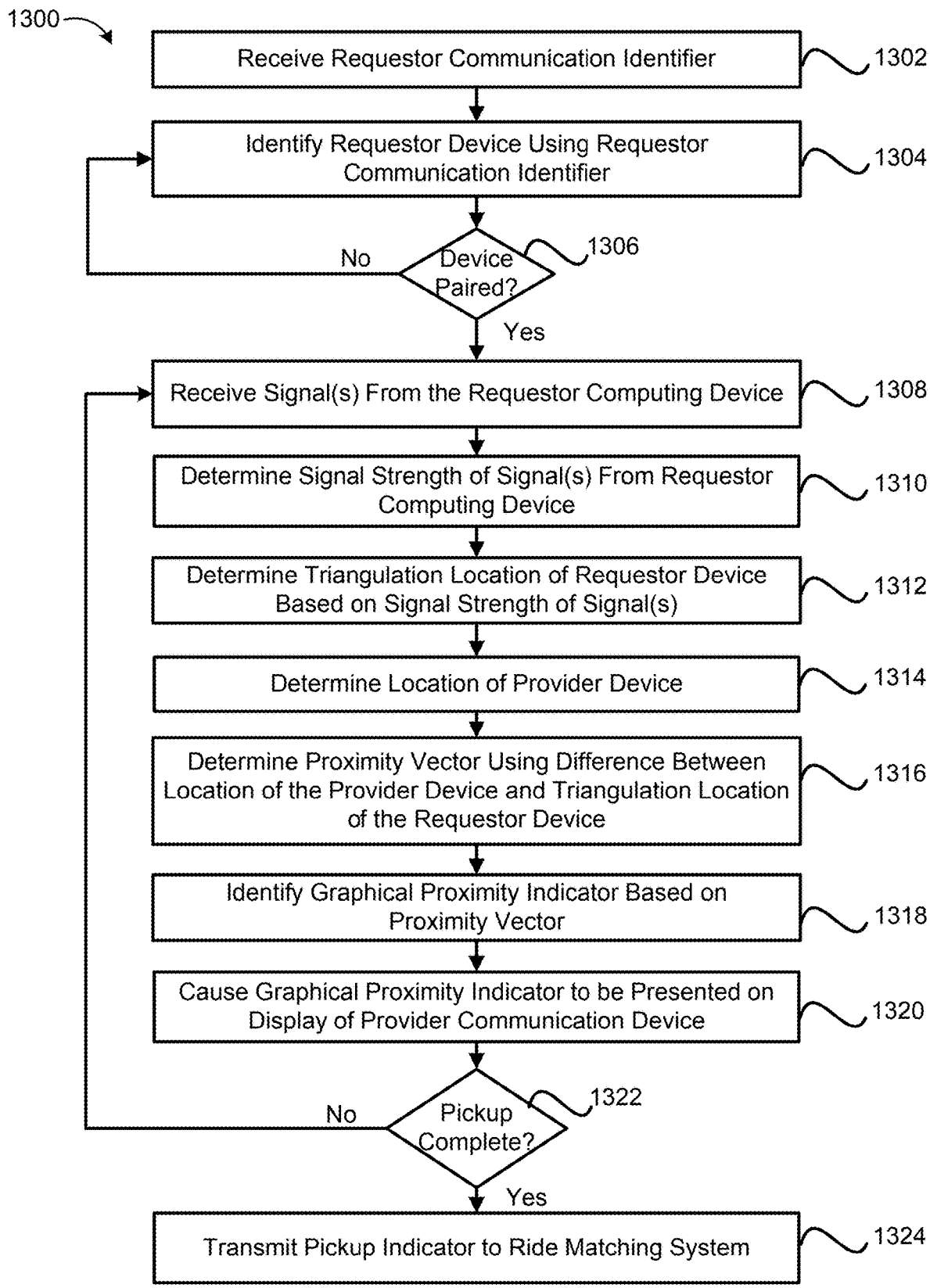
FIG. 13 illustrates an exemplary flow diagram of a method for locating and navigating to the location of a requestor based on proximity between provider devices and a requestor device, in accordance with embodiments of the present techniques.

FIG. 13 illustrates an exemplary flow diagram 1300 of a method for locating and navigating to the location of a requestor using a proximity vector to a paired requestor device, in accordance with embodiments of the present techniques. Steps 1302-1312 are similar to the process described above in reference to FIG. 8. However, FIG. 13 shows an embodiment where one or more provider devices pair with the requestor computing device. Accordingly, these steps are described in further detail below while the similar steps will not described in detail except to highlight the differences between the present process and the process described in FIG. 8.

For example, at step 1304, once the requestor computing device is identified, the provider computing device and the provider communication devices may pair with the requestor computing device. A variety of pairing mechanisms may be implemented. For example, in some embodiments, the pairing may be automatically accepted by the requestor computing device. In some embodiments, a requestor may be asked to approve the pairing before the pairing is completed. In some embodiments, the requestor computing device may authenticate the provider communication identifier by comparing a communication identifier in a pairing request to a provider communication identifier provided by the ride matching system before allowing the pairing. Other shared secrets, encryption keys, and/or authentication techniques may be implemented to ensure the security of the pairing and the respective computing devices.

At step 1306, the provider computing device and the provider communication devices may determine if they have successful paired with the requestor. If the requestor computing device has not successfully paired with the provider computing device and/or provider communication devices, the requestor computing device identification process (step 1304) may be repeated until a successful pairing is established. A pairing may not be successful because the requestor computing device is not within communication range of the provider devices, a discovery signal was not received due to timing limitations or constraints on the communication protocol being implemented, and/or due to an unsuccessful authentication process.

At step 1308, if the provider computing device and the provider communication devices have been successfully paired with the requestor computing device, the provider computing device and the provider communication devices may receive one or more signals from the requestor computing device over the paired connection. The signals may include any suitable information. For example, the signal may include identification information (e.g., requestor communication identifier), location information, and/or any other suitable information that can be used to further assist in determining the location of the requestor computing device. Further, the information may assist the provider in providing a successful ride by uploading ride preferences and/or any other information from the requestor computing device. Either way, the transceivers of the provider computing device and the provider communication devices may each receive a signal that is known to be associated with the requestor computing device. Accordingly, he provider computing device may receive the signals from the requestor computing device and may determine signal strengths of the signal or signals from the requestor computing device as described above in reference to FIG. 8. Accordingly, the process of steps 1308-1312 may continue as described above in reference to FIG. 8.

At step 1314, the provider computing device determines a location of the provider computing device. For example, the provider computing device may obtain the location from a GPS transceiver or other location determination components. For instance, the provider computing device may obtain a set of coordinates for the provider computing device in longitude and latitude coordinates, may receive a set of coordinates based on a reference map of the city, and/or any other objective location that can be referenced to the received requestor computing device location. The location information for both the requestor computing device and the provider computing device may be in the same format and/or the locations may be converted to the same format if received in different formats. For instance, if the GPS receiver provides locations in a different format than the ride matching system, the provider computing device may convert the location information received from the GPS transceiver into the appropriate format to be compared to location received from the ride matching system.

At step 1316, the provider computing device determines a proximity vector using a difference between the location of the provider computing device and the triangulation location of the requestor computing device. The provider computing device may determine the proximity vector by calculating a magnitude and a direction of the difference between the location of the provider computing device and the triangulation location of the requestor computing device. For example, the provider computing device may use the location of the provider computing device as an origin of a set of a reference axes and may identify the difference in location to the triangulation location of the requestor computing device based on the set of reference axes. The provider computing device may map the difference using reference axes based on the direction of travel of the provider computing device and calculate a magnitude by determining a hypotenuse of the x and y coordinates of the difference to the triangulation location of the requestor computing device. Further, the direction may be identified by taking the arctangent of the coordinates on the reference axes based on the difference between the triangulation location of the requestor computing device and the location of the provider computing device.

At step 1318, the provider computing device identifies a graphical proximity indicator associated with the proximity vector from a set of proximity indicators stored within the provider computing device. For example, the provider computing device may select a proximity indicator from a proximity indicator data store that is associated with the magnitude and the direction of the difference between the location of the provider computing device and the triangulation location of the requestor computing device. The proximity indicators may be grouped for a set of multiple different proximity vectors that have similar magnitudes and directions such that a smaller number of proximity indicators may be stored than possible proximity vectors. Additionally, different types of proximity indicators may be stored by the provider computing device such that the proximity indicators may show distance, direction, and/or both direction and distance to the requestor computing device location. The type of proximity indicator may be selected based on a profile of the provider, local, regional, and/or state-based preferences, and/or through any other suitable conditions.

At step 1320, the provider computing device presents the proximity indicator on a display associated with the provider computing device. For example, the provider computing device may cause the graphical proximity indicator that is selected for the proximity vector to be presented on a rear display of a provider communication device to easily and safely allow the provider to navigate to the triangulation location of the requestor computing device. As described above, in some embodiments, the timing of the presentation of the proximity indicator may be dependent upon a distance to the requestor and/or a condition being met (e.g., arrival at the request location, etc.).

At step 1322, the provider computing device determines whether the pickup has been completed. The provider computing device may determine whether the pickup is complete through similar methods to those described above in reference to FIG. 8. If the provider computing device determines that the pick-up has not been completed, the provider computing device repeats steps 1308-1320 and displays graphics associated with additional proximity indicators until a pick-up indicator has been received and/or until the provider application identifies that a pick-up has been completed. Thus, the provider computing device obtains an updated triangulation location for the requestor computing device, an updated location for the provider computing device, determines a second proximity vector, and presents a second proximity indicator associated with the second proximity vector to the provider to navigate the provider to the requestor computing device. As such, as the provider gets closer to the requestor computing device, the proximity indicator that is presented changes to better locate the triangulation location of the requestor computing device until the requestor is picked-up and the ride starts.

At step 1324, the provider computing device determines that the pick-up is completed and sends a pick-up indicator to the ride matching system to indicate that the matched ride has begun. At this point the requestor is in the vehicle or the on-demand service has otherwise begun and the ride matching system tracks the status associated with the ride and the provider may travel to the destination location associated with the matched ride.

Note that although the present example focuses on on-demand ride-sharing applications, any suitable service may be performed using similar functionality. For example, delivery of services may have a similar process implemented to find the location of delivery of the service. Moreover, note that the functionality described herein may be performed on a requestor computing device at the same time or independent of the provider computing device to allow the requestor computing device to navigate to the location of the provider computing device.

Figure 14:
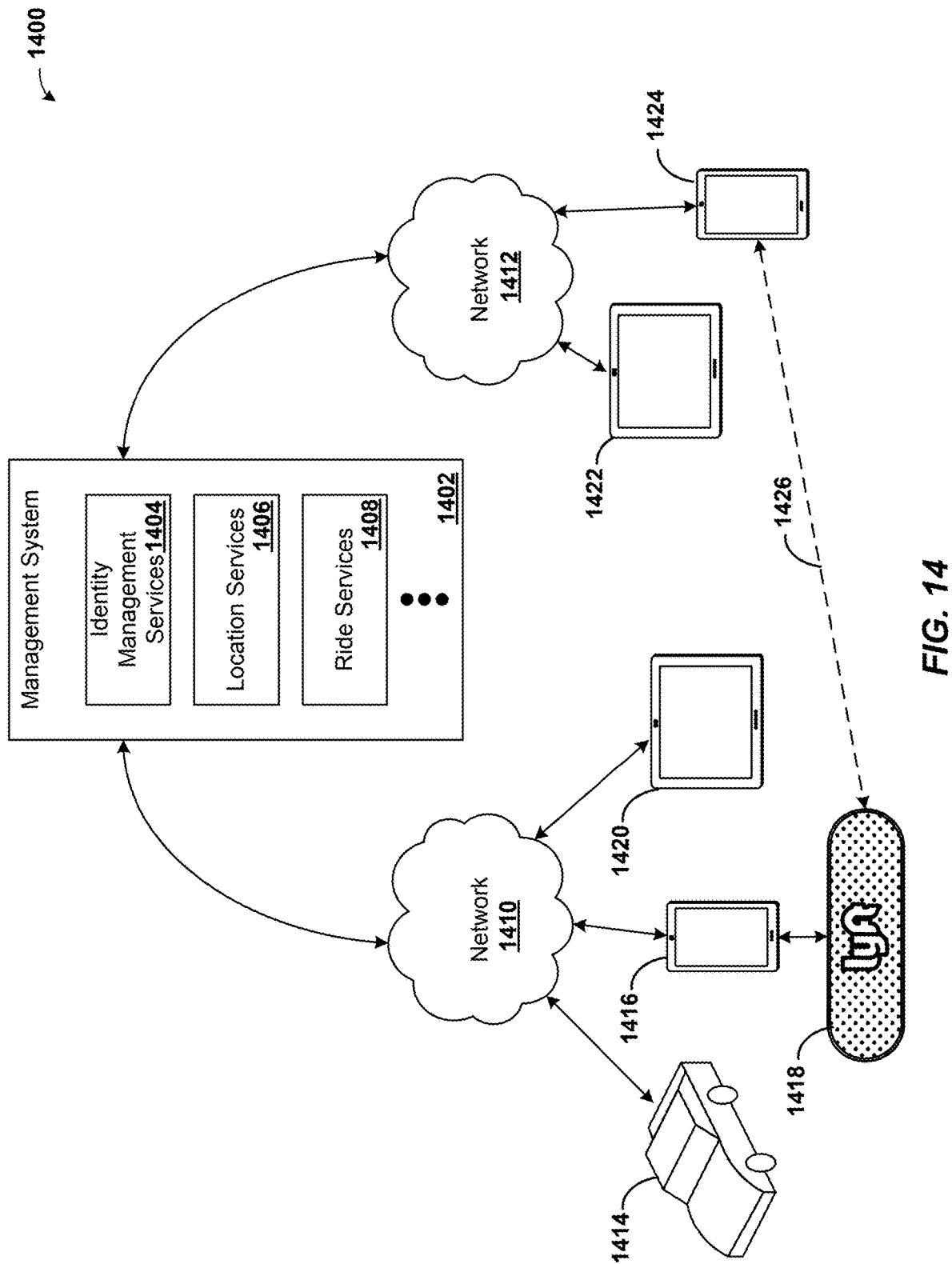
FIG. 14 illustrates an example requestor/provider management environment, in accordance with various embodiments.

FIG. 14 shows a requestor/provider management environment 1400, in accordance with various embodiments. As shown in FIG. 14, a management system 1402 can be configured to provide various services to requestor and provider devices. Management system 1402 can run one or more services or software applications, including identity management services 1404, location services 1406, ride services 1408, or other services. Although three services are shown as being provided by management system 1402, more or fewer services may be provided in various implementations. In various embodiments, management system 1402 may include one or more general purpose computers, server computers, clustered computing systems, cloud-based computing systems, or any other computing systems or arrangements of computing systems. Management system 1402 may be configured to run any or all of the services and/or software applications described with respect to various embodiments of the present techniques described herein. In some embodiments, management system 1402 can run any appropriate operating system as well as various server applications, such as common gateway interface (CGI) servers, JAVA® servers, hypertext transport protocol (HTTP) servers, file transfer protocol (FTP) servers, database servers, etc.

Identity management services 1404 may include various identity services, such as access management and authorization services for requestors and providers when interacting with management system 1402. This may include, e.g., authenticating the identity of providers and determining that the providers are authorized to provide services through management system 1402. Similarly, requestors' identities may be authenticated to determine whether the requestor is authorized to receive the requested services through management system 1402. Identity management services 1404 may also control access to provider and requestor data maintained by management system 1402, such as driving and/or ride histories, personal data, or other user data. Location services 1406 may include navigation and/or traffic management services and user interfaces, or other location services.

In various embodiments, ride services 1408 may include ride matching and management services to connect a requestor to a provider. Ride services 1408 may include a user interface and or may receive data from requestors and providers through applications executing on their respective devices. Ride services 1408 may, e.g., confirm the identity of requestors and providers using identity management services 1404, and determine that each user is authorized for the requested ride service. In some embodiments, ride services 1408 can identify an appropriate provider using a location obtained from a requestor and location services 1406 to identify, e.g., a closest provider. As such, ride services 1408 can manage the distribution and allocation of provider and requestor resources, consistent with embodiments described herein.

Management system 1402 can connect to various devices through network 1410 and 1412. Networks 1410, 1412 can include any network configured to send and/or receive data communications using various communication protocols, such as AppleTalk, transmission control protocol/Internet protocol (TCP/IP), Internet packet exchange (IPX), systems network architecture (SNA), etc. In some embodiments, networks 1410, 1412 can include local area networks (LAN), such as Ethernet, Token-Ring or other LANs. Networks 1410, 1412 can include a wide-area network and/or the Internet. In some embodiments, networks 1410, 1412 can include VPNs (virtual private networks), PSTNs (a public switched telephone networks), infra-red networks, or any wireless network, including networks implementing the IEEE 802.11 family of standards, Bluetooth®, Bluetooth® Low Energy, NFC and/or any other wireless protocol. In various embodiments, networks 1410, 1412 can include a mobile network, such as a mobile telephone network, cellular network, satellite network, or other mobile network. Networks 1410, 1412 may be the same as communication network 170 in FIG. 1. In some embodiments, networks 1410, 1412 may each include a combination of networks described herein or other networks as are known to one of ordinary skill in the art.

Users may then utilize one or more services provided by management system 1402 using applications executing on provider and requestor devices. As shown in FIG. 14, provider computing devices 1414, 1416, 1418, and/or 1420 may include mobile devices (e.g., an iPhone®, an iPad®, mobile telephone, tablet computer, a personal digital assistant (PDA)), wearable devices (e.g., head mounted displays, etc.), thin client devices, gaming consoles, or other devices configured to communicate over one or more networks 1410, 1412. Each provider or requestor device can execute various operating systems (e.g., Android, iOS, etc.) and configured to communicate over the Internet, Blackberry® messenger, short message service (SMS), email, and various other messaging applications and/or communication protocols. The requestor and provider computing devices can include general purpose computers (e.g., personal computers, laptop computers, or other computing devices executing operating systems such as macOS®, Windows®, Linux®, various UNIX® or UNIX- or Linux-based operating systems, or other operating systems). In some embodiments, provider computing device 1414 can include a vehicle-integrated computing device, such as a vehicle navigation system, or other computing device integrated with the vehicle itself.

In some embodiments, provider computing device 1418 can include a provider communication device configured to communicate with users, such as drivers, passengers, pedestrians, and other users. In some embodiments, provider communication device 1418 can communicate directly with management system 1402 or through another provider computing device, such as provider computing device 1416. In some embodiments, a requestor computing device can communicate 1426 directly with provider communication device 1418 over a peer-to-peer connection, Bluetooth connection, NFC connection, ad hoc wireless network, or any other communication channel or connection. Although particular devices are shown as communicating with management system 1402 over networks 1410 and 1412, in various embodiments, management system 1402 can expose an interface, such as an application programming interface (API) or service provider interface (SPI) to enable various third parties which may serve as an intermediary between end users and management system 1402.

Although requestor/provider management environment 1400 is shown with four provider devices and two requestor devices, any number of devices may be supported. The various components shown and described herein may be implemented in hardware, firmware, software, or combinations thereof. Although one embodiment of a requestor/provider management environment is depicted in FIG. 14, this is merely one implementation and not meant to be limiting.

Figure 15:
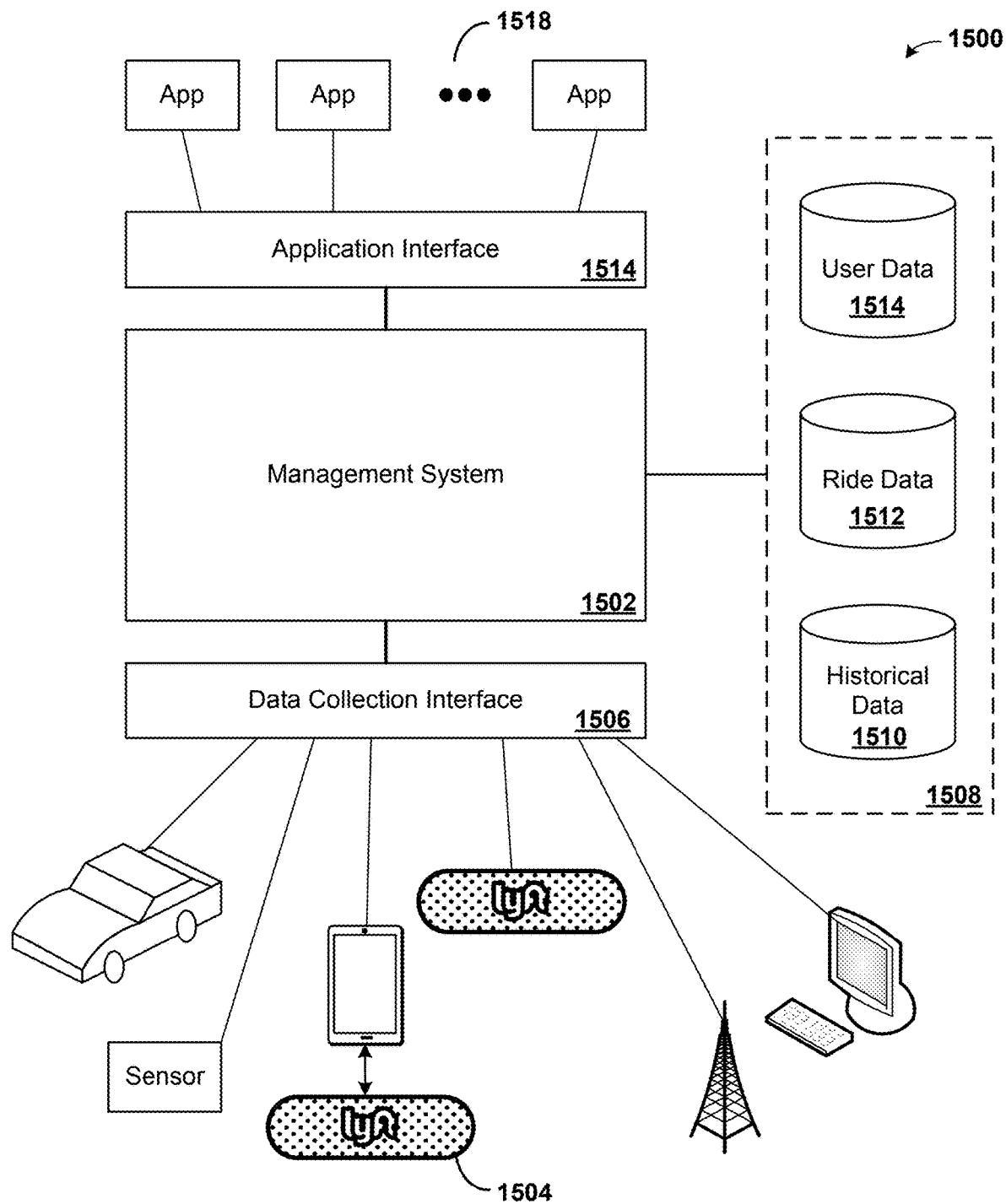
FIG. 15 illustrates an example data collection and application management system, in accordance with various embodiments.

FIG. 15 shows a data collection and application management environment 1500, in accordance with various embodiments. As shown in FIG. 15, management system 1502 may be configured to collect data from various data collection devices 1504 through a data collection interface 1506. As discussed above, management system 1502 may include one or more computers and/or servers or any combination thereof. Data collection devices 1504 may include, but are not limited to, user devices (including provider and requestor computing devices, such as those discussed above), provider communication devices, laptop or desktop computers, vehicle data (e.g., from sensors integrated into or otherwise connected to vehicles), ground-based or satellite-based sources (e.g., location data, traffic data, weather data, etc.), or other sensor data (e.g., roadway embedded sensors, traffic sensors, etc.). Data collection interface 1506 can include, e.g., an extensible device framework configured to support interfaces for each data collection device. In various embodiments, data collection interface 1506 can be extended to support new data collection devices as they are released and/or to update existing interfaces to support changes to existing data collection devices. In various embodiments, data collection devices may communicate with data collection interface 1506 over one or more networks. The networks may include any network or communication protocol as would be recognized by one of ordinary skill in the art, including those networks discussed above.

As shown in FIG. 15, data received from data collection devices 1504 can be stored in data store 1508. Data store 1508 can include one or more data stores, such as databases, object storage systems and services, cloud-based storage services, and other data stores. For example, various data stores may be implemented on a non-transitory storage medium accessible to management system 1502, such as historical data store 1510, ride data store 1512, and user data store 1514. Data stores 1508 can be local to management system 1502, or remote and accessible over a network, such as those networks discussed above or a storage-area network or other networked storage system. In various embodiments, historical data 1510 may include historical traffic data, weather data, request data, road condition data, or any other data for a given region or regions received from various data collection devices. Ride data 1512 may include route data, request data, timing data, and other ride related data, in aggregate and/or by requestor or provider. User data 1514 may include user account data, preferences, location history, and other user-specific data. Although particular data stores are shown, any data collected and/or stored according to the various embodiments described herein may be stored in data stores 1508.

As shown in FIG. 15, an application interface 1516 can be provided by management system 1502 to enable various apps 1518 to access data and/or services available through management system 1502. Apps 1518 can run on various user devices (including provider and requestor computing devices, such as those discussed above) and/or may include cloud-based or other distributed apps configured to run across various devices (e.g., computers, servers, or combinations thereof). Apps 1518 may include, e.g., aggregation and/or reporting apps which may utilize data 1508 to provide various services (e.g., third-party ride request and management apps). In various embodiments, application interface 1516 can include an API and/or SPI enabling third party development of apps 1518. In some embodiments, application interface 1516 may include a web interface, enabling web-based access to data 1508 and/or services provided by management system 1502. In various embodiments, apps 1518 may run on devices configured to communicate with application interface 1516 over one or more networks. The networks may include any network or communication protocol as would be recognized by one of ordinary skill in the art, including those networks discussed above, in accordance with an embodiment of the present disclosure.

Although a particular implementation of environment 1500 is shown in FIG. 15, this is for illustration purposes only and not intended to be limited. In some embodiments, environment 1500 may include fewer or more components, as would be recognized by one or ordinary skill in the art.

FIGS. 16A-16C show an example provider communication device 1600 in accordance with various embodiments. As shown in FIG. 16A, a front view 1602 of provider communication device 1600 shows a front display 1604. In some embodiments, front display 1604 may include a secondary region or separate display 1606. As shown in FIG. 16A, the front display may include various display technologies including, but not limited to, one or more liquid crystal displays (LCDs), one or more arrays of light emitting diodes (LEDs), or other display technologies. In some embodiments, the front display may include a cover that divides the display into multiple regions. In some embodiments, separate displays may be associated with each region. The front display 1604 can be configured to show colors, patterns, color patterns, or other identifying information to requestors and other users external to a provider vehicle. In some embodiments, the secondary region or separate display 1606 may be configured to display the same, or contrasting, information as front display 1604. In some embodiments, the front display 1604 may comprise a large number of light sources that can be configured to display a wide range of patterns, colors, images, and/or any other information on the front display of provider communication device 1600. For example, the front display may have an array of light emitting diodes (LEDs) that may be configured to provide any number of colors either individually or in combination with the other LEDs in the array.

As shown in FIG. 16B, a rear view 1608 of provider communication device 1600 shows a rear display 1610. Rear display 1610, as with front display 1604, rear display 1610 may include various display technologies including, but not limited to, one or more liquid crystal displays (LCDs), one or more arrays of light emitting diodes (LEDs), or other display technologies. The rear display may be configured to display information to the provider, the requestor, or other users internal to a provider vehicle. In some embodiments, rear display 1610 may be configured to provide information to users external to the provider vehicle who are located behind the provider vehicle. As further shown in FIG. 16B, provider communication device may include a power button 1612 or other switch which can be used to turn on or off the provider communication device. In various embodiments, power button 1612 may be a hardware button or switch that physically controls whether power is provided to provider communication device 1600. Alternatively, power button 1612 may be a soft button that initiates a startup/shutdown procedure managed by software and/or firmware instructions. In some embodiments, provider communication device 1600 may not include a power button 1612. Additionally, provider communication device may include one or more light features 1614 (such as one or more LEDs or other light sources) configured to illuminate areas adjacent to the provider communication device 1600. In some embodiments, provider communication device 1600 can include a connector to enable a provider computing device to be connected to the provider communication device 1600. In some embodiments, power may be provided to the provider communication device through connector 1616.

FIG. 16C shows a block diagram of provider computing device 1600. As shown in FIG. 16C, provider communication device can include a processor 1618. Processor 1618 can control information displayed on rear display 1610 and front display 1604. As noted, each display can display information to different users, depending on the positioning of the users and the provider communication device. In some embodiments, display data 1620 can include stored display patterns, sequences, colors, text, or other data to be displayed on the front and/or rear display. In some embodiments, display data 1620 can be a buffer, storing display data as it is received from a connected provider computing device. In some embodiments, display data 1620 can include a hard disk drive, solid state drive, memory, or other storage device including information from a management system. In some embodiments, lighting controller 1622 can manage the colors and/or other lighting displayed by light features 1614. In some embodiments, communication component 1624 can manage networking or other communication between the provider communication device 1600 and one or more networking components or other computing devices. In various embodiments, communication component 1624 can be configured to communicate over Wi-Fi, Bluetooth, NFC, RF, or any other wired or wireless communication network or protocol. In some embodiments, provider communication device 1600 can include an input/output system 1626 configured to provide output in addition to that provided through the displays and/or to receive inputs from users. For example, I/O system 1626 can include an image capture device configured to recognize motion or gesture-based inputs from a user. Additionally, or alternatively, I/O system 1626 can include an audio device configured to provide audio outputs (such as alerts, instructions, or other information) to users and/or receive audio inputs, such as audio commands, which may be interpreted by a voice recognition system or other command interface. In some embodiments, I/O system may include one or more input or output ports, such as USB (universal serial bus) ports, lightning connector ports, or other ports enabling users to directly connect their devices to the provider communication device (e.g., to exchange data, verify identity information, provide power, etc.).

Figure 17:
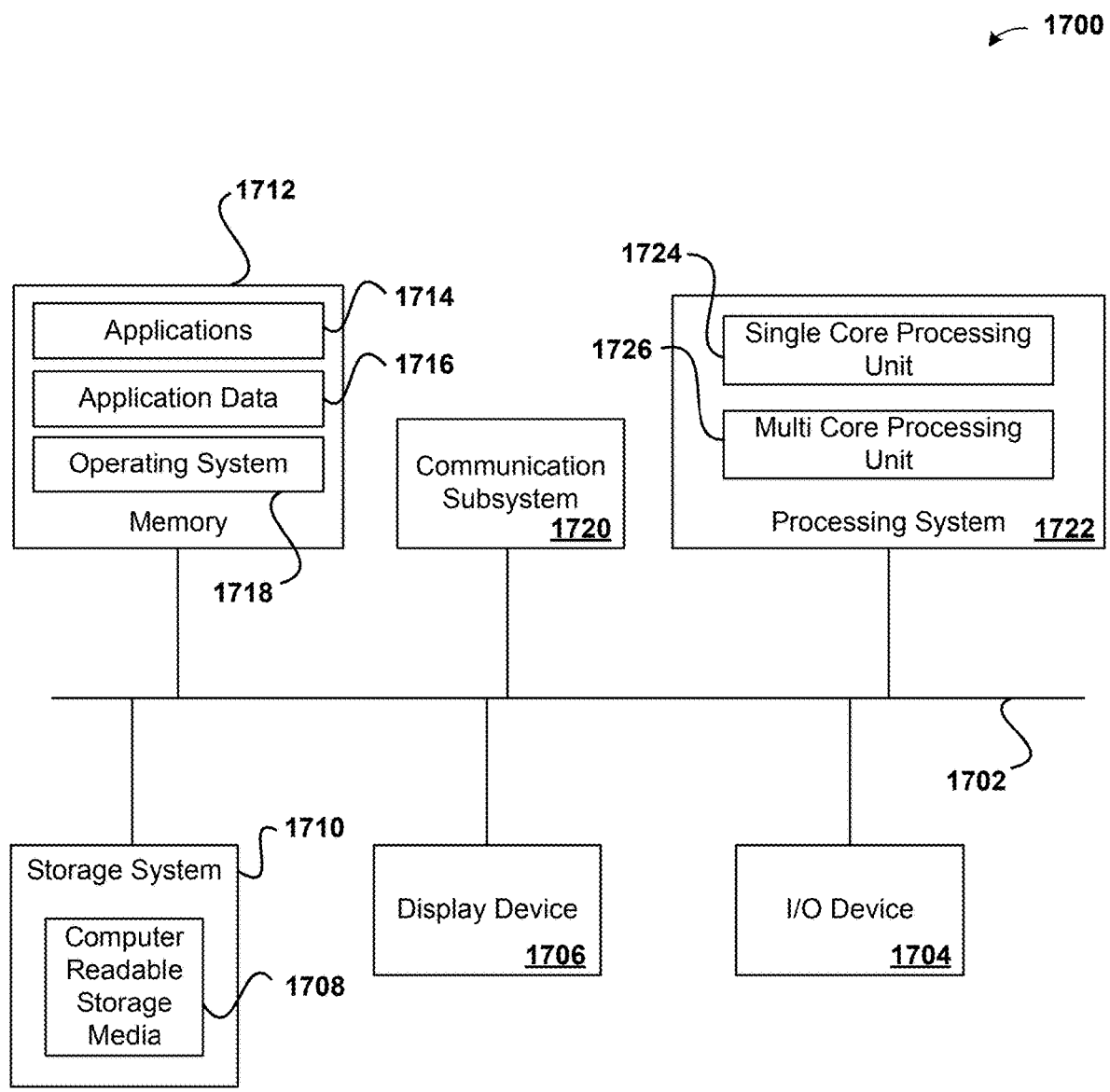
FIG. 17 illustrates an example computer system, in accordance with various embodiments.

FIG. 17 shows an example computer system 1700, in accordance with various embodiments. In various embodiments, computer system 1700 may be used to implement any of the systems, devices, or methods described herein. In some embodiments, computer system 1700 may correspond to any of the various devices described herein, including, but not limited, to mobile devices, tablet computing devices, wearable devices, personal or laptop computers, vehicle-based computing devices, or other devices or systems described herein. As shown in FIG. 17, computer system 1700 can include various subsystems connected by a bus 1702. The subsystems may include an I/O device subsystem 1704, a display device subsystem 1706, and a storage subsystem 1710 including one or more computer readable storage media 1708. The subsystems may also include a memory subsystem 1712, a communication subsystem 1720, and a processing subsystem 1722.

In system 1700, bus 1702 facilitates communication between the various subsystems. Although a single bus 1702 is shown, alternative bus configurations may also be used. Bus 1702 may include any bus or other component to facilitate such communication as is known to one of ordinary skill in the art. Examples of such bus systems may include a local bus, parallel bus, serial bus, bus network, and/or multiple bus systems coordinated by a bus controller. Bus 1702 may include one or more buses implementing various standards such as Parallel ATA, serial ATA, Industry Standard Architecture (ISA) bus, Extended ISA (EISA) bus, MicroChannel Architecture (MCA) bus, Peripheral Component Interconnect (PCI) bus, or any other architecture or standard as is known in the art.

In some embodiments, I/O device subsystem 1704 may include various input and/or output devices or interfaces for communicating with such devices. Such devices may include, without limitation, a touch screen or other touch-sensitive input device, a keyboard, a mouse, a trackball, a motion sensor or other movement-based gesture recognition device, a scroll wheel, a click wheel, a dial, a button, a switch, audio recognition devices configured to receive voice commands, microphones, image capture based devices such as eye activity monitors configured to recognize commands based on eye movement or blinking, and other types of input devices. I/O device subsystem 1704 may also include identification or authentication devices, such as fingerprint scanners, voiceprint scanners, iris scanners, or other biometric sensors or detectors. In various embodiments, I/O device subsystem may include audio output devices, such as speakers, media players, or other output devices.

Computer system 1700 may include a display device subsystem 1706. Display device subsystem may include one or more lights, such as an one or more light emitting diodes (LEDs), LED arrays, a liquid crystal display (LCD) or plasma display or other flat-screen display, a touch screen, a head-mounted display or other wearable display device, a projection device, a cathode ray tube (CRT), and any other display technology configured to visually convey information. In various embodiments, display device subsystem 1706 may include a controller and/or interface for controlling and/or communicating with an external display, such as any of the above-mentioned display technologies.

As shown in FIG. 17, system 1700 may include storage subsystem 1710 including various computer readable storage media 1708, such as hard disk drives, solid state drives (including RAM-based and/or flash-based SSDs), or other storage devices. In various embodiments, computer readable storage media 1708 can be configured to store software, including programs, code, or other instructions, that is executable by a processor to provide functionality described herein. In some embodiments, storage system 1710 may include various data stores or repositories or interface with various data stores or repositories that store data used with embodiments described herein. Such data stores may include, databases, object storage systems and services, data lakes or other data warehouse services or systems, distributed data stores, cloud-based storage systems and services, file systems, and any other data storage system or service. In some embodiments, storage system 1710 can include a media reader, card reader, or other storage interface to communicate with one or more external and/or removable storage devices. In various embodiments, computer readable storage media 1708 can include any appropriate storage medium or combination of storage media. For example, computer readable storage media 1708 can include, but is not limited to, any one or more of random access memory (RAM), read only memory (ROM), electronically erasable programmable ROM (EEPROM), flash memory or other memory technology, optical storage (e.g., CD-ROM, digital versatile disk (DVD), Blu-ray® disk or other optical storage device), magnetic storage (e.g., tape drives, cassettes, magnetic disk storage or other magnetic storage devices). In some embodiments, computer readable storage media can include data signals or any other medium through which data can be sent and/or received.

Memory subsystem 1712 can include various types of memory, including RAM, ROM, flash memory, or other memory. Memory 1712 can include SRAM (static RAM) or DRAM (dynamic RAM). In some embodiments, memory 1712 can include a BIOS (basic input/output system) or other firmware configured to manage initialization of various components during, e.g., startup. As shown in FIG. 17, memory 1712 can include applications 1714 and application data 1716. Applications 1714 may include programs, code, or other instructions, that can be executed by a processor. Applications 1714 can include various applications such as browser clients, location management applications, ride management applications, data management applications, and any other application. Application data 1716 can include any data produced and/or consumed by applications 1714. Memory 1712 can additionally include operating system 1718, such as macOS®, Windows®, Linux®, various UNIX® or UNIX- or Linux-based operating systems, or other operating systems.

System 1700 can also include a communication subsystem 1720 configured to facilitate communication between system 1700 and various external computer systems and/or networks (such as the Internet, a local area network (LAN), a wide area network (WAN), a mobile network, or any other network). Communication subsystem 1720 can include hardware and/or software to enable communication over various wired (such as Ethernet or other wired communication technology) or wireless communication channels, such as radio transceivers to facilitate communication over wireless networks, mobile or cellular voice and/or data networks, WiFi networks, or other wireless communication networks. For example, the communication network is shown as communication network 170 in FIG. 1. Additionally, or alternatively, communication subsystem 1720 can include hardware and/or software components to communicate with satellite-based or ground-based location services, such as GPS (global positioning system). In some embodiments, communication subsystem 1720 may include, or interface with, various hardware or software sensors. The sensors may be configured to provide continuous or and/or periodic data or data streams to a computer system through communication subsystem 1720

As shown in FIG. 17, processing system 1722 can include one or more processors or other devices operable to control computing system 1700. Such processors can include single core processors 1724, multi core processors, which can include central processing units (CPUs), graphical processing units (GPUs), application specific integrated circuits (ASICs), digital signal processors (DSPs) or any other generalized or specialized microprocessor or integrated circuit. Various processors within processing system 1722, such as processors 1724 and 1726, may be used independently or in combination depending on application.

Various other configurations are may also be used, with particular elements that are depicted as being implemented in hardware may instead be implemented in software, firmware, or a combination thereof. One of ordinary skill in the art will recognize various alternatives to the specific embodiments described herein.

The specification and figures describe particular embodiments which are provided for ease of description and illustration and are not intended to be restrictive. Embodiments may be implemented to be used in various environments without departing from the spirit and scope of the disclosure.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method comprising:
    transmitting, by a dynamic transportation matching system, transport request information associated with a mobile requestor computing device to a vehicle comprising a first provider computing device at a front end of the vehicle and a second provider computing device at a back end of the vehicle different than the front end, the transport request information including a request location and a reported location of the mobile requestor computing device;
    determining, by the dynamic transportation matching system, a requestor communication identifier that uniquely identifies the mobile requestor computing device;
    transmitting, by the dynamic transportation matching system, the requestor communication identifier to the first provider computing device and the second provider computing device;
    determining, based on GPS information, whether the vehicle is within a threshold distance of the request location; and
    in response to determining, based on GPS information, that the vehicle is within the threshold distance of the request location;
        identifying a plurality of signals with corresponding communication identifiers from mobile computing devices, the plurality of signals with corresponding communication identifiers comprising a first set of signals from the mobile requestor computing device and additional signals from additional mobile computing devices;
        identifying, via the first provider computing device at the front end of the vehicle, a first signal strength relative to the mobile requestor computing device, wherein the first provider computing device utilizes the requestor communication identifier to identify the mobile requestor computing device from amongst the additional signals from the additional mobile computing devices by comparing the requestor communication identifier to each of the plurality of signals with corresponding communication identifiers;
        identifying, via the second provider computing device at the back end of the vehicle, a second signal strength relative to the mobile requestor computing device, wherein the second provider computing device utilizes the requestor communication identifier to identify the mobile requestor computing device from amongst the additional signals from the additional mobile computing devices by comparing the requestor communication identifier to each of the plurality of signals with corresponding communication identifiers;
        refining the reported location of the mobile requestor computing device based on the first signal strength and the second signal strength to identify a refined location of the mobile requestor computing device;
        based on the refined location of the mobile requestor computing device, generating a proximity vector between the vehicle and the mobile requestor computing device; and
    transmitting instructions to the vehicle to navigate to the mobile requestor computing device based on the proximity vector.

2. The computer-implemented method of claim 1, further comprising:
    establishing a first paired connection between the first provider computing device and the mobile requestor computing device utilizing the requestor communication identifier; and determining the first signal strength based on the first paired connection between the first provider computing device and the mobile requestor computing device.

3. The computer-implemented method of claim 2, further comprising:
establishing a second paired connection between the second provider computing device and the mobile requestor computing device utilizing the requestor communication identifier; and
determining the second signal strength based on the second paired connection between the second provider computing device and the mobile requestor computing device.

4. The computer-implemented method of claim 1, wherein refining the reported location of the mobile requestor computing device comprises:
determining a first signal strength radius corresponding to the first provider computing device;
determining a second signal strength radius corresponding to the second provider computing device; and
identifying the refined location of the mobile requestor computing device based on the first signal strength radius and the second signal strength radius.

5. The computer-implemented method of claim 4, wherein
refining the reported location of the mobile requestor computing device comprises determining an intersection point between the first signal strength radius and the second signal strength radius.

6. The computer-implemented method of claim 1, further comprising:
identifying, via the first provider computing device, a first plurality of signal strengths relative to the mobile requestor computing device over a period of time; and
identifying, via the second provider computing device, a second plurality of signal strengths relative to the mobile requestor computing device over a period of time.

7. The computer-implemented method of claim 6, further comprising refining the reported location of the mobile requestor computing device by combining the first plurality of signal strengths over the period of time and combining the second plurality of signal strengths over the period of time.

8. A system comprising:
at least one processor; and
at least one non-transitory computer readable medium storing instructions thereon that, when executed by the at least one processor, cause the system to:
transmit transport request information associated with a mobile requestor computing device to a vehicle comprising a first provider computing device at a first end of the vehicle and a second provider computing device at a second end of the vehicle different than the first end, the transport request information including a request location and a reported location of the mobile requestor computing device;
determine a requestor communication identifier that uniquely identifies the mobile requestor computing device;
transmit the requestor communication identifier to the first provider computing device and the second provider computing device;
determine, based on GPS information, whether the vehicle is within a threshold distance of the request location; and
in response to determining, based on GPS information, that the vehicle is within a threshold distance of the request location:
identify a plurality of signals with corresponding communication identifiers from mobile computing devices, the plurality of signals with corresponding communication identifiers comprising a first set of signals from the mobile requestor computing device and additional signals from additional mobile computing devices;
identify, via the first provider computing device at the first end of the vehicle, a first signal strength relative to the mobile requestor computing device, wherein the first provider computing device utilizes the requestor communication identifier to identify the mobile requestor computing device from amongst the additional signals from the additional mobile computing devices by comparing the requestor communication identifier to each of the plurality of signals with corresponding communication identifiers;
identify, via the second provider computing device at the second end of the vehicle, a second signal strength relative to the mobile requestor computing device, wherein the second provider computing device utilizes the requestor communication identifier to identify the mobile requestor computing device from amongst the additional signals from the additional mobile computing devices by comparing the requestor communication identifier to each of the plurality of signals with corresponding communication identifiers;
refine the reported location of the mobile requestor computing device based on the first signal strength and the second signal strength to identify an exact location of the mobile requestor computing device;
based on the refined location of the mobile requestor computing device, generate a proximity vector between the vehicle and the mobile requestor computing device; and
transmit instructions to the vehicle to navigate to the mobile requestor computing device based on the proximity vector.

9. The system of claim 8, further comprising instructions that, when executed by the at least one processor, cause the system to:
establish a first paired connection between the first provider computing device and the mobile requestor computing device utilizing the requestor communication identifier; and
determine the first signal strength based on the first paired connection between the first provider computing device and the mobile requestor computing device.

10. The system of claim 9, further comprising instructions that, when executed by the at least one processor, cause the system to:
establish a second paired connection between the second provider computing device and the mobile requestor computing device utilizing the requestor communication identifier; and
determine the second signal strength based on the second paired connection between the second provider computing device and the mobile requestor computing device.

11. The system of claim 8, further comprising instructions that, when executed by the at least one processor, cause the system to:

determine a first signal strength radius corresponding to the first provider computing device;
determine a second signal strength radius corresponding to the second provider computing device; and
identify the refined location of the mobile requestor computing device based on the first signal strength radius and the second signal strength radius.

12. The system of claim 11, further comprising instructions that, when executed by the at least one processor, cause the system to refine the reported location of the mobile requestor computing device by determining an intersection point between the first signal strength radius and the second signal strength radius.

13. The system of claim 8, further comprising instructions that, when executed by the at least one processor, cause the system to:
identify, via the first provider computing device, a first plurality of signal strengths relative to the mobile requestor computing device over a period of time; and
identify, via the second provider computing device, a second plurality of signal strengths relative to the mobile requestor computing device over a period of time.

14. The system of claim 13, further comprising instructions that, when executed by the at least one processor, cause the system to refine the reported location of the mobile requestor computing device by combining the first plurality of signal strengths over the period of time and combining the second plurality of signal strengths over the period of time.

15. A non-transitory computer readable medium storing instructions thereon that, when executed by at least one processor, cause a computing device to:
transmit transport request information associated with a mobile requestor computing device to a vehicle comprising a first provider computing device at a first end of the vehicle and a second provider computing device at a second end of the vehicle different than the first end, the transport request information including a request location and a reported location of the mobile requestor computing device;
determine a requestor communication identifier that uniquely identifies the mobile requestor computing device;
transmit the requestor communication identifier to the first provider computing device and the second provider computing device
determine, based on GPS information, whether the vehicle is within a threshold distance of the request location; and
in response to determining, based on GPS information, that the vehicle is within a threshold distance of the request location:
identify a plurality of signals with corresponding communication identifiers from mobile computing devices, the plurality of signals with corresponding communication identifiers comprising a first set of signals from the mobile requestor computing device and additional signals from additional mobile computing devices;
identify, via the first provider computing device at the first end of the vehicle, a first signal strength relative to the mobile requestor computing device, wherein the first provider computing device utilizes the requestor communication identifier to identify the mobile requestor computing device from amongst the additional signals from the additional mobile computing devices by comparing the requestor communication identifier to each of the plurality of signals with corresponding communication identifiers;
identify, via the second provider computing device at the second end of the vehicle, a second signal strength relative to the mobile requestor computing device, wherein the second provider computing device utilizes the requestor communication identifier to identify the mobile requestor computing device from amongst the additional signals from the additional mobile computing devices by comparing the requestor communication identifier to each of the plurality of signals with corresponding communication identifiers;
refine the reported location of the mobile requestor computing device based on the first signal strength and the second signal strength to identify an exact location of the mobile requestor computing device;
based on the refined location of the mobile requestor computing device, generate a proximity vector between the vehicle and the mobile requestor computing device; and
transmit instructions to the vehicle to navigate to the mobile requestor computing device based on the proximity vector.

16. The non-transitory computer readable medium of claim 15, further comprising instructions that, when executed by the at least one processor, cause the computing device to:
establish a first paired connection between the first provider computing device and the mobile requestor computing device utilizing the requestor communication identifier;
determine the first signal strength based on the first paired connection between the first provider computing device and the mobile requestor computing device;
establish a second paired connection between the second provider computing device and the mobile requestor computing device utilizing the requestor communication identifier; and
determine the second signal strength based on the second paired connection between the second provider computing device and the mobile requestor computing device.

17. The non-transitory computer readable medium of claim 15, further comprising instructions that, when executed by the at least one processor, cause the computing device to:
determine a first signal strength radius corresponding to the first provider computing device;
determine a second signal strength radius corresponding to the second provider computing device; and
identify the refined location of the mobile requestor computing device based on the first signal strength radius and the second signal strength radius.

18. The non-transitory computer readable medium of claim 17, further comprising instructions that, when executed by the at least one processor, cause the computing device to refine the reported location of the mobile requestor computing device by determining an intersection point between the first signal strength radius and the second signal strength radius.

19. The non-transitory computer readable medium of claim 15, further comprising instructions that, when executed by the at least one processor, cause the computing device to:

identify, via the first provider computing device, a first plurality of signal strengths relative to the mobile requestor computing device over a period of time; and identify, via the second provider computing device, a second plurality of signal strengths relative to the mobile requestor computing device over a period of time.

20. The non-transitory computer readable medium of claim 19, further comprising instructions that, when executed by the at least one processor, cause the computing device to refine the reported location of the mobile requestor computing device by combining the first plurality of signal strengths over the period of time and combining the second plurality of signal strengths over the period of time.

* * * * *